US010680471B2

(12) United States Patent
Hashimoto et al.

(10) Patent No.: US 10,680,471 B2
(45) Date of Patent: Jun. 9, 2020

(54) PERMANENT MAGNET MOTOR, POSITION ESTIMATION APPARATUS AND MOTOR DRIVE CONTROL APPARATUS

(71) Applicants: Takashi Hashimoto, Kanagawa (JP); Takahisa Koike, Tokyo (JP); Haruyuki Suzuki, Kanagawa (JP); Eiki Yoshimizu, Kanagawa (JP); Norihiro Yamamoto, Kanagawa (JP)

(72) Inventors: Takashi Hashimoto, Kanagawa (JP); Takahisa Koike, Tokyo (JP); Haruyuki Suzuki, Kanagawa (JP); Eiki Yoshimizu, Kanagawa (JP); Norihiro Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1073 days.

(21) Appl. No.: 14/948,500

(22) Filed: Nov. 23, 2015

(65) Prior Publication Data

US 2016/0149443 A1 May 26, 2016

(30) Foreign Application Priority Data

Nov. 26, 2014 (JP) .................................. 2014-238934
Nov. 19, 2015 (JP) .................................. 2015-227018

(51) Int. Cl.
*H02K 1/14* (2006.01)
*H02P 6/18* (2016.01)
(Continued)

(52) U.S. Cl.
CPC .............. *H02K 1/145* (2013.01); *H02K 1/278* (2013.01); *H02K 37/14* (2013.01); *H02P 6/183* (2013.01)

(58) Field of Classification Search
CPC ........ H02K 37/14; H02K 1/145; H02K 1/278; H02P 6/183
See application file for complete search history.

(56) References Cited

U.S. PATENT DOCUMENTS 6,191,509 B1 * 2/2001 Yura ...................... H02K 37/14
310/49.11
2002/0113569 A1 * 8/2002 Iijima ...................... H02P 6/18
318/727

FOREIGN PATENT DOCUMENTS

CN 1262548 A 8/2000
CN 2831598 * 10/2006
(Continued)

OTHER PUBLICATIONS

Translation of CN2831598 has been attached.*
Chinese Office Action and English translation thereof dated Sep. 26, 2017.

*Primary Examiner* — Jorge L Carrasquillo
*Assistant Examiner* — Zoheb S Imtiaz
(74) *Attorney, Agent, or Firm* — Harness, Dickey & Pierce, P.L.C.

(57) ABSTRACT

A permanent magnet motor is provided, which includes a rotor including a rotation axle and a plurality of magnetized rotor magnets on a periphery, which rotor magnets are magnetized to form alternately N-poles and S-poles; first and second ring-shaped-claw-pole units, whose inner circumferences face the rotor magnets, including a plurality of first and second claw-poles along the inner circumference, the first and the second claw-poles being closely adjacent to each other extending alternately in upward and downward axis directions of the rotation axle, bottom sides of the first and the second claw-poles forming a ring shape. A first opening portion is formed in a first joint surface of the first ring-shaped-claw-pole unit, to be joined to the second ring-shaped-claw-pole unit, and the second opening portion is formed in a second joint surface of the second ring-shaped-claw-pole unit, to be joined to the first ring-shaped-claw-pole unit.

14 Claims, 29 Drawing Sheets

(51) Int. Cl.
*H02K 1/27* (2006.01)
*H02K 37/14* (2006.01)

(56) References Cited

FOREIGN PATENT DOCUMENTS

| | | |
|---|---|---|
| CN | 2831598 Y | 10/2006 |
| JP | 2003-199279 A | 7/2003 |
| JP | 2014-099996 | 5/2014 |

* cited by examiner

FIG.6
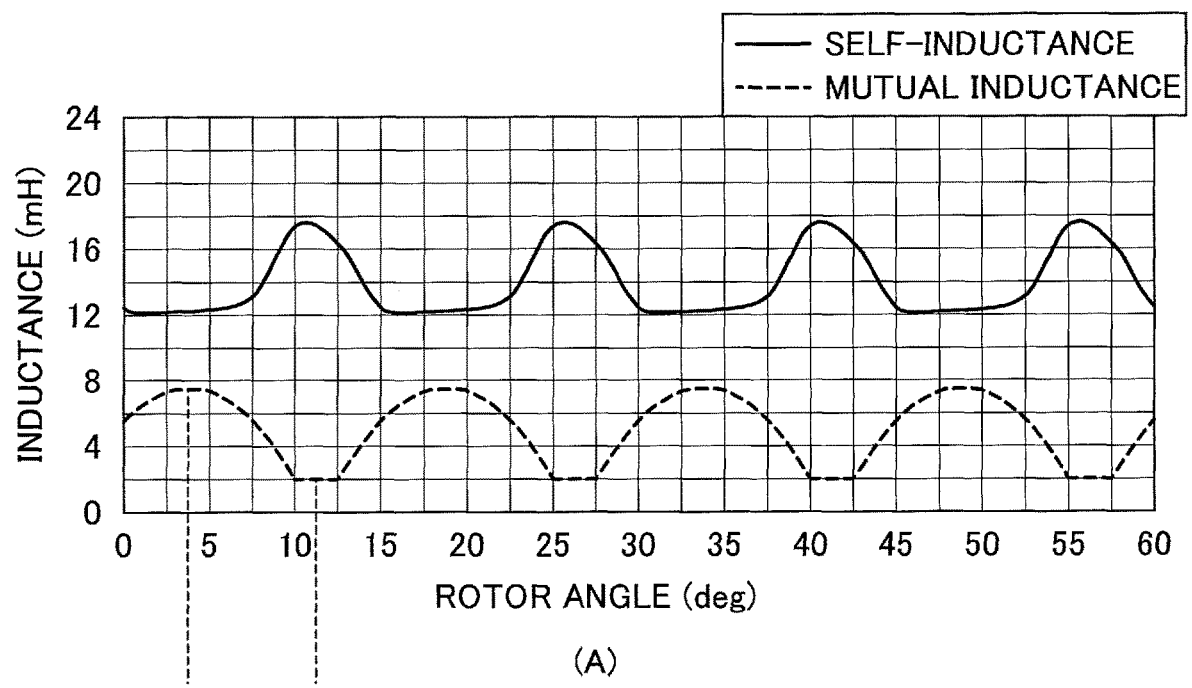
(A)
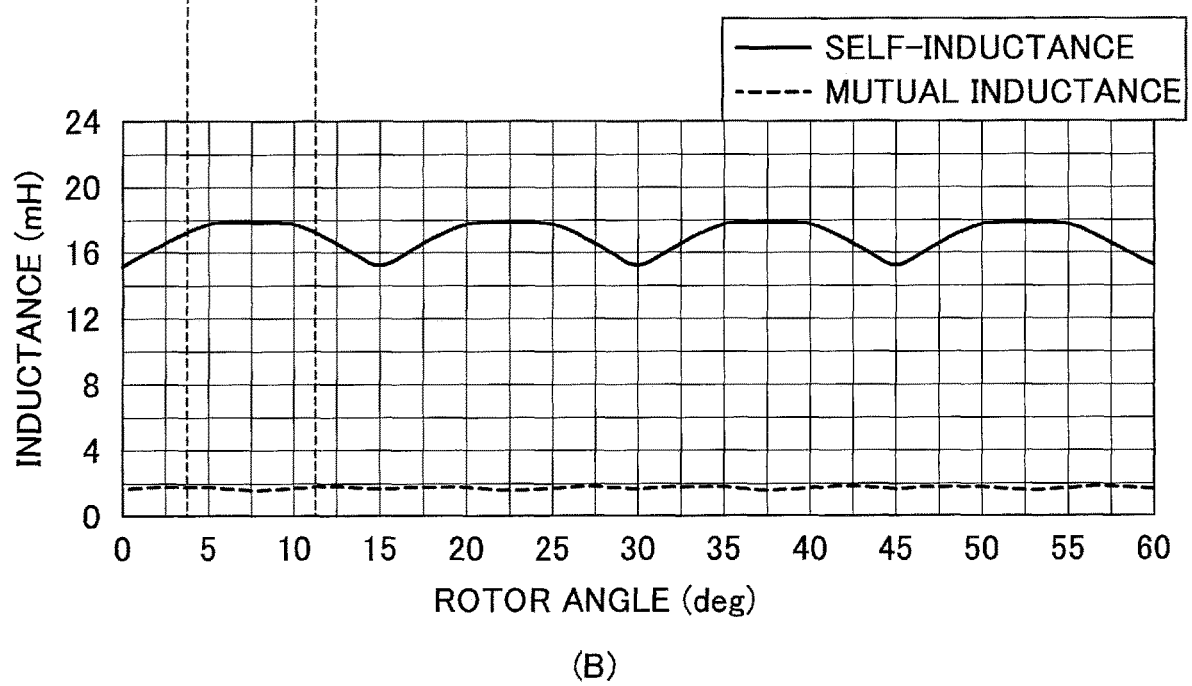
(B)

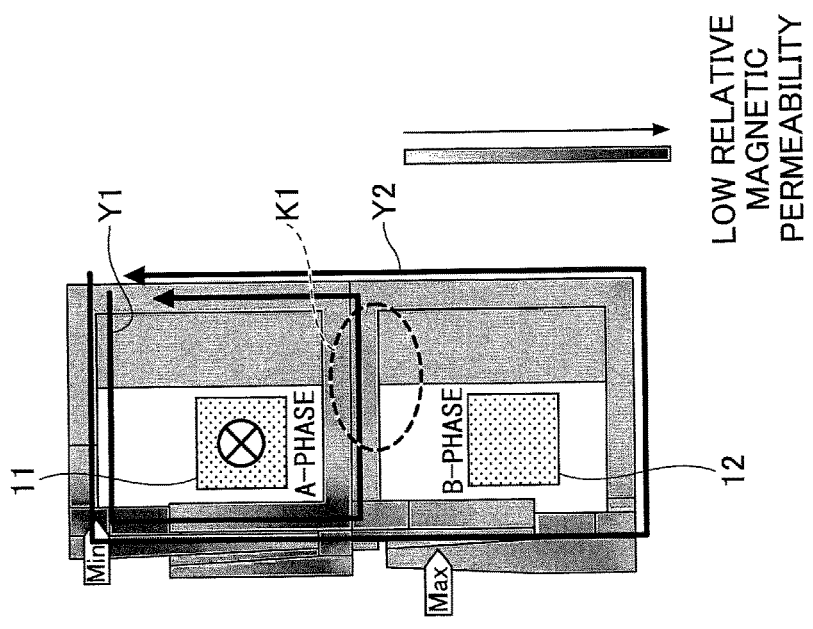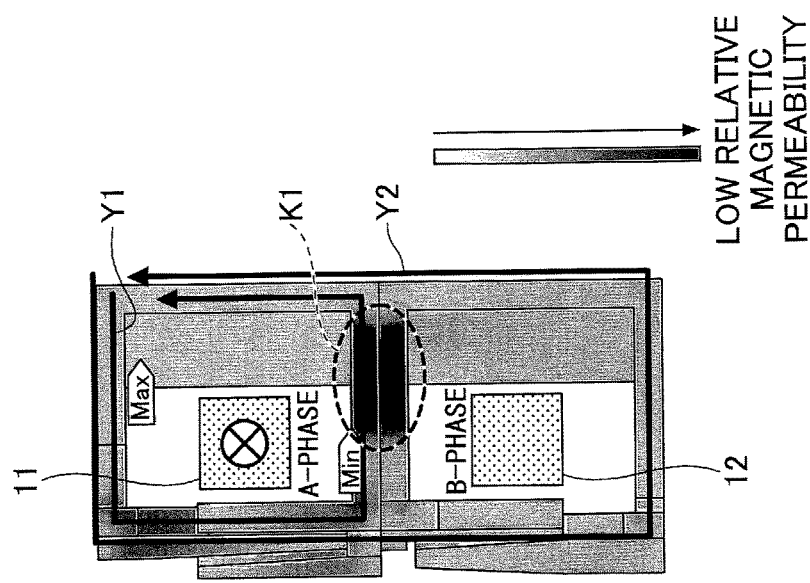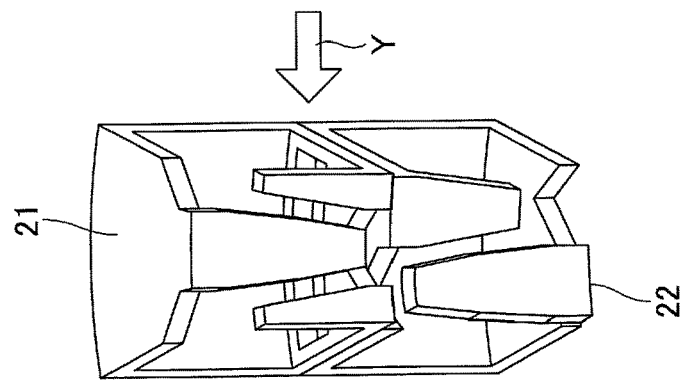

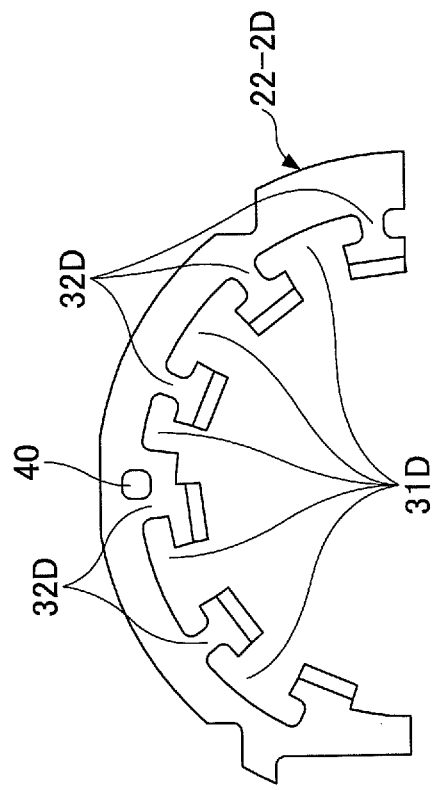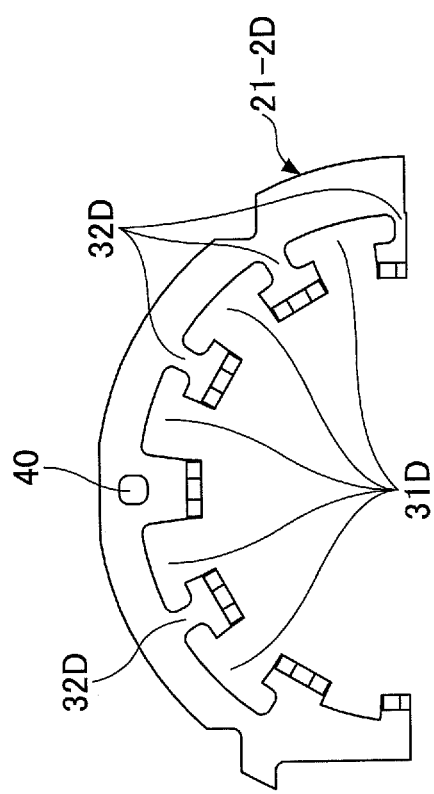

PERMANENT MAGNET MOTOR, POSITION ESTIMATION APPARATUS AND MOTOR DRIVE CONTROL APPARATUS

BACKGROUND OF THE INVENTION

1. Field of the Invention

The present invention relates to a permanent magnet motor, a position estimation apparatus and a motor drive control apparatus.

2. Description of the Related Art

Conventionally, a permanent magnet motor which does not consume energy for a magnetic field is widely used as a high-efficiency motor (Patent Document 1). The permanent magnet motor, especially an interior permanent magnet (IPM) motor in which a permanent magnet is embedded in a rotor, has a property (characteristic) called a salient pole property in which a coil inductance changes according to the rotor angle. Because of the salient pole property, the IPM motor, being capable of using not only a magnetic torque due to the magnetic flux of the permanent magnet but also a reluctance torque due to the salient pole property, is highly efficient and has a wide use-speed range, and thus, the application range of the IPM motor is expanding these days.

Further, the IPM motor is also used in a sensor-less angle estimation in which the rotor angle is estimated without using a rotation sensor, by using the salient pole property.

CITATION LIST

Patent Document

[Patent Document 1] Japanese Laid-Open Patent Application No. 2014-99996

SUMMARY OF THE INVENTION

The present invention is made in view of the above. An objective of the present invention is to expand the salient pole property.

The present invention provides a permanent magnet motor which includes a rotor configured to include a rotation axle and a plurality of magnetized rotor magnets on a periphery, which rotor magnets are magnetized to form alternately N-poles and S-poles; a first ring-shaped claw-pole unit, whose inner circumference faces the rotor magnets, is configured to include a plurality of first claw-poles along the inner circumference, the first claw-poles being closely adjacent to each other extending alternately in an upward axis direction of the rotation axle and in a downward axis direction of the rotation axle, a bottom side of the first claw-poles forming a ring shape; a second ring-shaped claw-pole unit, whose inner circumference faces the rotor magnets, is configured to include a plurality of second claw-poles along the inner circumference, the second claw-poles being closely adjacent to each other extending alternately in an upward axis direction of the rotation axle and in a downward axis direction of the rotation axle, a bottom side of the second claw-poles forming a ring shape, a first opening portion being formed in a first joint surface of the first ring-shaped claw-pole unit, to be joined to the second ring-shaped claw-pole unit; and a second opening portion formed in a second joint surface of the second ring-shaped claw-pole unit, to be joined to the first ring-shaped claw-pole unit.

The present invention is capable of expanding the salient pole property.

BRIEF DESCRIPTION OF THE DRAWINGS

FIG. 6 is a drawing illustrating self-inductance and mutual inductance according to the first embodiment;

FIGS. 7A, 7B and 7C are drawings illustrating a relative magnetic permeability distribution in a stepping motor according to the first embodiment;

FIGS. 30A and 30B are drawings illustrating the inner yoke of a stepping motor according to the fifth embodiment;

DETAILED DESCRIPTION OF THE PREFERRED EMBODIMENTS

First Embodiment

Figure 1:
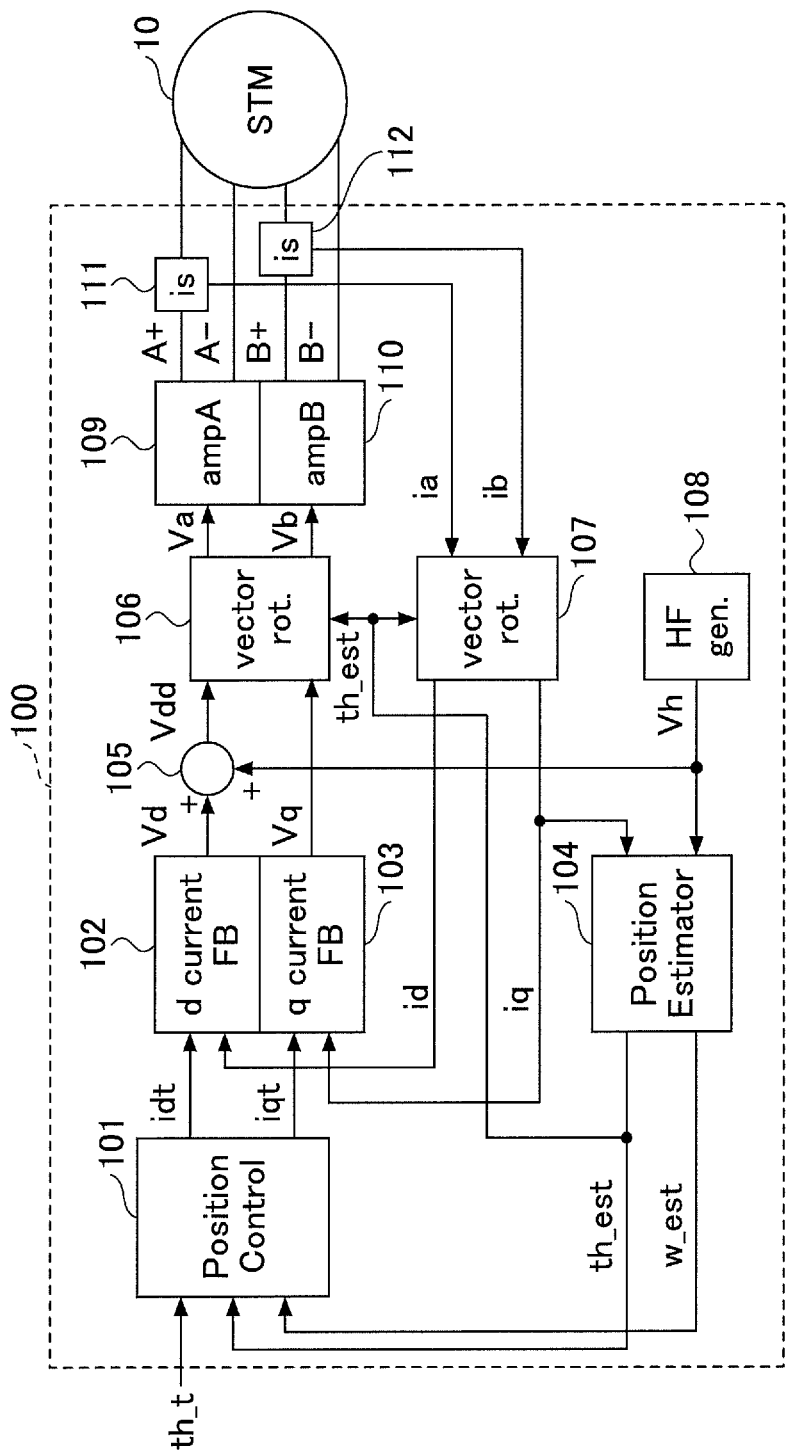
FIG. 1 is a drawing illustrating a motor drive control apparatus.

In the following, the first embodiment will be described referring to the accompanied drawings. FIG. 1 is a drawing illustrating a motor drive control apparatus 100.

The motor drive control apparatus 100 shown in FIG. 1 controls driving of a stepping motor 10. The stepping motor (STM) 10 according to the present embodiment causes a rotor made of a permanent magnet to rotate by, for example, providing exciting coils of A-phase and B-phase with alternate currents having a phase difference of about 90 degrees, respectively. Further, the stepping motor 10 (hereinafter simply referred to as "motor 10") has a salient pole property. The salient pole property is a property in which motor coil inductance changes according to a rotor position.

In the present embodiment, the motor 10 uses a property in which self-inductance of the A-phase coil and self-inductance of the B-phase coil are functions of rotor angle, and change sinusoidally.

Further, inventors of the present invention have paid attention to the fact that, when the degree of the salient pole property of a mutual inductance between the A-phase coil and the B-phase coil is caused to be about the same as the degree of the salient pole property of self-inductances of the A-phase coil and the B-phase coil, an estimation position error for performing position estimation of the rotor occurs in a stable manner.

In other words, in the motor 10 of the present invention, the degree of the salient pole property of a mutual inductance between the A-phase coil and the B-phase coil is set to be about the same as the degree of the salient pole property of the self-inductances of the A-phase coil and the B-phase coil. The details of the motor 10 will be described later.

The motor drive control apparatus 100 includes a position feedback control unit 101, a d-axis current control unit 102, a q-axis current control unit 103, a position estimation unit 104, an adder 105, vector rotation units 106 and 107, a high-frequency generator 108, amplification units 109 and 110, and current sensors 111 and 112. It should be noted that the current sensors 111 and 112 may be outside the motor drive control apparatus 100.

The motor drive control apparatus 100 provides the motor 10 with a drive current for driving the motor 10 superimposed by a high-frequency component generated by the high-frequency generation unit 108. Further, by using the position estimation unit 104, the motor drive control apparatus 100 estimates a position of the rotor of the motor 10 according to the response signal of the high-frequency component detected by the current sensors 111 and 112.

Therefore, in the present embodiment, even in the case where, for example, the drive current provided for the motor 10 is infinitesimal, the response signal of the high-frequency component is detected and the position of the rotor can be estimated based on the response signal.

Therefore, the motor drive control apparatus 100 according to the present embodiment can estimate the rotor position by using closed-loop control without using a sensor such as an encoder for detecting the rotor position even in the case where, for example, the rotation of the motor 10 is stopped, or where the rotation speed is low.

The position feedback control unit 101 according to the present embodiment compares a target position instruction value "th_t" with position information "th_est" which indicates an estimated current position of the rotor, and outputs amplitude target values "idt" and "iqt" of the drive current according to the comparison result. By doing the above operation, in the present embodiment, the amplitude of the drive current is controlled to cause the target position instruction value th_t and the position information th_est to be the same, and the rotor position is controlled.

In the case where the target position instruction value th_t is increased or decreased in a unit time by a certain amount, the position information th_est is also controlled to be increased or decreased in a unit time by a certain amount. Therefore, the rotor of the motor 10 according to the present embodiment maintains a constant rotational speed. Further, in the case where the target position instruction value th_t is fixed to a fixed value, the position information th_est is also controlled to be fixed, or to maintain the current position.

The d-axis current control unit 102 according to the present embodiment outputs a d-axis drive voltage "Vd" in such a way that the d-axis current vector "id" detected by the vector rotation unit 107 coincides with the amplitude target value "idt" of the d-axis drive current. The q-axis current control unit 103 according to the present embodiment outputs a q-axis drive voltage "Vq" in such a way that the q-axis current vector "iq" detected by the vector rotation unit 107 coincides with the amplitude target value "iqt" of the q-axis drive current. It is preferable that the d-axis current control unit 102 and the q-axis current control unit 103 are, for example, proportional integral control devices which perform proportional integral control.

The position estimation unit 104 according to the present embodiment estimates a position (electrical angle) and a speed of the rotor of the motor 10 based on the high-frequency component superimposed on the q-axis current, and outputs the position information (angle) "th_est" indicating an estimated position of the rotor and speed information "w_est" indicating an estimated rotational speed of the rotor. The details of the position estimation unit 104 will be described later.

The adder 105 according to the present embodiment adds a d-axis drive voltage "Vd" and a high-frequency signal "Vh". In the present embodiment, it is assumed that a frequency of the high-frequency signal Vh is sufficiently higher than the product (drive frequency of the motor coil) of the rotational speed of the rotor and a number of magnetic pole pairs. The details of the frequency of the high-frequency signal Vh will be described later.

The vector rotation unit 106 according to the present embodiment rotates the d-axis drive voltage "Vd" and the q-axis drive voltage "Vq" by position information (angle) "th_est", and outputs an A-phase drive voltage vector "Va" and a B-phase drive voltage vector "Vb". The following formula 1 is an arithmetic expression used by the vector rotation unit 106.

[Math 1]

$$\begin{pmatrix} Va \\ Vb \end{pmatrix} = \begin{pmatrix} \cos(th) & -\sin(th) \\ \sin(th) & \cos(th) \end{pmatrix} \begin{pmatrix} Vd \\ Vq \end{pmatrix} \quad \text{FORMULA 1}$$

The drive voltages "Vd" and "Vq" are output drive voltages of the d-axis current control unit 102 and the q-axis current control unit 103, which are signals close to the direct current. In the present embodiment, because the signals close to the direct current are rotated by the angle "th_est" which corresponds to the rotor angle, the drive voltage vectors Va and Vb are alternate signals.

The vector rotation unit 107 according to the present embodiment rotates the detected current vector "ia" detected in the A-phase and the detected current vector "ib" detected in the B-phase by the angle "th_est", and outputs a d-axis current vector "id" and a q-axis current vector "iq". The following formula 2 is an arithmetic expression used by the vector rotation unit 107.

[Math 2]

$$\begin{pmatrix} id \\ iq \end{pmatrix} = \begin{pmatrix} \cos(th) & \sin(th) \\ -\sin(th) & \cos(th) \end{pmatrix} \begin{pmatrix} ia \\ ia \end{pmatrix} \quad \text{FORMULA 2}$$

The vector rotation units 106 and 107 have vector rotation directions opposite to each other. The detected current vectors "ia" and "ib" correspond to coil currents and are alternating signals having frequencies of rotor rotational speed times the number of magnetic pole pairs. In the present embodiment, because the alternate signals "ia" and "ib" are rotated by the angle "th_est" which corresponds to the rotor angle, the d-axis current vector "id" and the q-axis current vector "iq" are signals close to the direct current.

The high-frequency generation unit 108 according to the present embodiment generates and outputs a high-frequency signal "Vh" to be superimposed on the drive voltage. It is assumed that the high-frequency signal Vh has a fixed frequency which is sufficiently higher than the product (drive frequency of the motor coil) of the rotational speed of the rotor and the number of magnetic pole pairs.

As described above, in the present embodiment, by generating the high-frequency signal "Vh", it becomes easier for the position estimation unit 104 to separate the drive signal (drive current) and the response signal of the high-frequency component and the estimation accuracy of the rotor position can be improved. Further, in the present embodiment, because the mechanical response of the motor 10 can be reduced by generating the high-frequency signal "Vh", the impact for controlling rotor's position and speed can be reduced.

Further, in the present embodiment, if the frequency of the high-frequency signal "Vh" is caused to be higher than the human audible range, then the unpleasant auditory noise can be reduced. The waveform of the high-frequency signal "Vh" may be a sine wave, a square wave, or any other signal as long as it is periodic.

The amplification unit 109 according to the present embodiment converts the A-phase drive voltage vector "Va" to voltages which are actually applied to the coils included in the motor 10 (a voltage "A+" and a voltage "A−" in FIG. 1). Further, the amplification unit 110 converts the B-phase drive voltage vector "Vb" to voltages which are actually applied to the coils included in the motor 10 (a voltage "B+" and a voltage "B−" in FIG. 1). The voltage "A+" and the voltage "A−" are signals having phases opposite to each other, and so are the voltage "B+" and the voltage "B−". Specifically, the amplification units 109 and 110 may be realized by a linear power amplifier, a known pulse width modulation (PWM) inverter circuit, etc.

The current sensor 111 according to the present embodiment detects an A-phase coil current and outputs the detected current vector "ia". Further, the current sensor 112 according to the present embodiment detects a B-phase coil current and outputs the detected current vector "ib". The current sensors 111 and 112 may be realized by, for example, a configuration in which a low resistance element is serially inserted into the coil drive line or the bus of the amplification units 109 and 110 and differential amplification is applied to both ends of the low resistance element, or a magnetic sensor such as a Hall element may be used.

Figure 2:
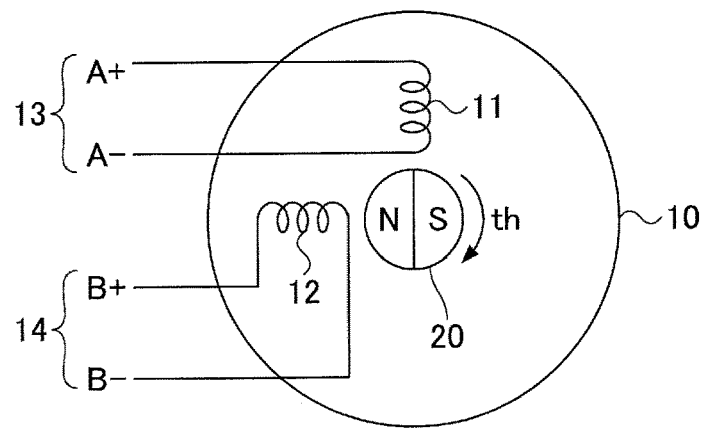
FIG. 2 is a drawing illustrating an example of a structure of a stepping motor.

Next, the motor 10 according to the present embodiment will be described. FIG. 2 is a drawing illustrating an example of a structure of a stepping motor 10.

The motor 10 according to the present embodiment includes an A-phase coil (armature coil) 11, a B-phase coil (armature coil) 12 and a rotor 20. In the motor 10, the A-phase coil 11 includes an A+ terminal and an A− terminal as A-phase coil terminals 13. The B-phase coil 12 includes a B+ terminal and a B− terminal as B-phase coil terminals 14. The A-phase coil 11 and the B-phase coil 12 are not connected and are disposed independently. In the rotor 20 according to the present embodiment, permanent magnets are disposed on the circumference, or the circumference is magnetized.

In the motor 10, the A-phase coil 11 and the B-phase coil 12 are disposed in such a way that they each have 90-degree relationships with respect to a magnetic flux direction generated by the permanent magnets of the rotor 20. In the motor 10, by providing the A-phase coil 11 and the B-phase coil 12 with alternating currents having 90-degree shifted phase, the rotor 20 is rotated. Further, in the motor 10, when the phases of the alternate currents provided for the A-phase coil 11 and the B-phase coil 12 are fixed to certain phases, the rotor 20 is maintained at a position magnetically balanced.

Figure 3:
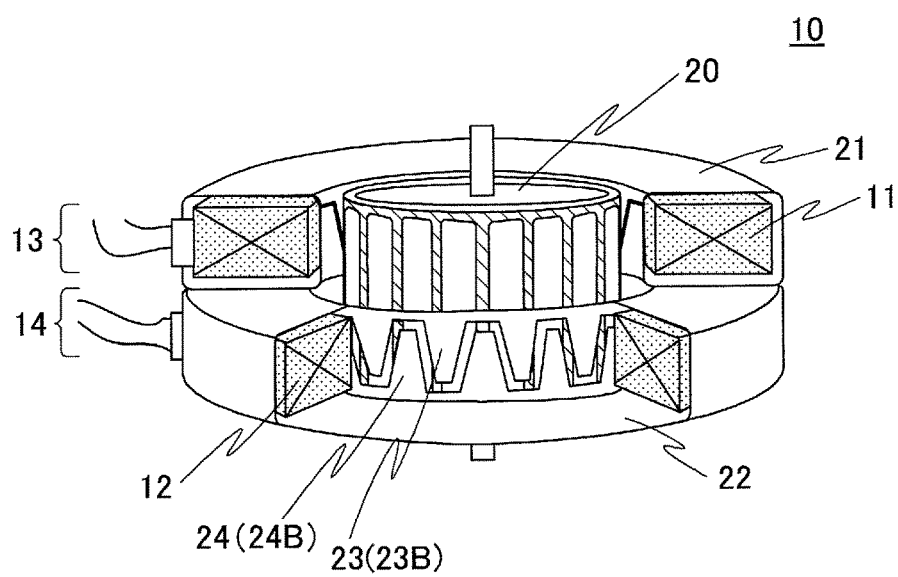
FIG. 3 is a drawing illustrating an example of a cross section of a stepping motor.

FIG. 3 is a drawing illustrating an example of a cross section of a stepping motor according to the present embodiment. In an example shown in FIG. 3, the rotor 20 is magnetized to form multiple poles.

The rotor 20 has a cylindrical shape and the cylinder surface is magnetized to form permanent magnets having alternately an N-pole and an S-pole. The A-phase coil 11 is wound in an annular manner outside of the circumference of the rotor 20. An A-phase coil terminal 13 is taken out from the A-phase coil 11.

The A-phase coil 11 is surrounded by a conductor (ring-shaped claw-pole unit) 21. The conductor 21 is disposed surrounding the A-phase coil 11. In the inner diameter (to the side facing the rotor 20) of the conductor 21, claw-shaped conductive members extend from one direction (from upper direction in the figure), which are referred to as inductors (claw-poles) 23. The pitch of the claw-poles 23 is the same as the pitch of the magnetic pole pairs of the rotor 20. All of the claw-poles 23 form an N-pole core or an S-pole core depending on the coil current direction.

Similar claw-poles 24 extend from the other direction (from lower direction in the figure) of the A-phase coil 11, which form a core whose polarity is opposite to the claw-poles 23 extending from the upper direction. It should be noted that although, in FIG. 3, it is indicated that the claw-poles 23 and 24 are formed in the B-phase coil 12, the claw-poles 23 and 24 are formed also in the A-phase coil 11. In the following description, the claw-poles of the A-phase coil 11 are referred to as the claw-poles 23A and 24A, and the claw-poles of the B-phase coil 12 are referred to as the claw-poles 23B and 24B.

The B-phase coil terminal 14 for the B-phase coil 12 is the same as the A-phase coil terminal 13 for the A-phase coil 11. The B-phase coil 12 is surrounded by a conductor 22. In the conductor 22, similar to the conductor 21, claw-poles 23B extending from the upper direction and claw-poles 24B extending from the lower direction are formed.

In the present embodiment, the claw-poles 23A and 24A in the A-phase are disposed 90-degree shifted from the claw-poles 23B and 24B in the B-phase assuming that one round of magnetic pole pairs of the rotor 20 corresponds to 360 degrees (so-called electrical angle). With the above arrangement, the motor 10 shown in FIG. 3 has a configuration which includes a 2-phase coil equivalent to the A-phase coil 11 and the B-phase coil 12 shown in FIG. 2 and a rotor which is magnetized to form multiple poles.

Figure 4:
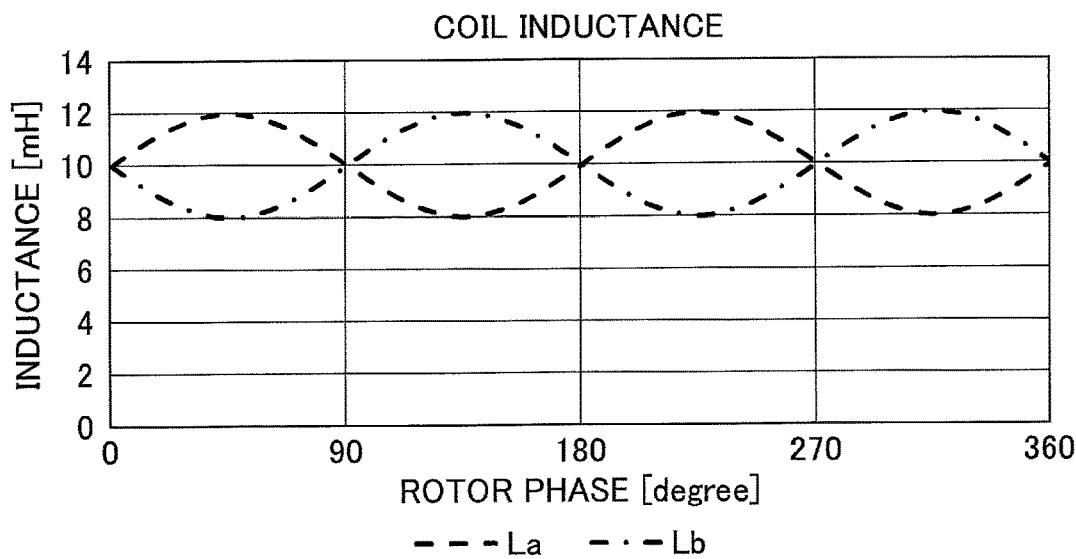
FIG. 4 is a drawing illustrating an example of a relationship between motor's coil inductance and a rotor.

FIG. 4 is a drawing illustrating an example of a relationship between motor's coil inductance and a rotor. In FIG. 4, the horizontal axis is a phase of the rotor 20 indicated by electrical angle. Here, the unit of the electrical angle is degree. The relationship between the electrical angle and the mechanical angle of the rotor 20 is shown in the following formula 3.

$$\text{Electrical angle} = \text{mechanical angle of the rotor} * \text{a number of magnetic pole pairs} \quad \text{(formula 3)}$$

In FIG. 4, the vertical axis is the coil inductance whose unit is mH (milliHenry). A dashed line "La" indicates the coil inductance of the A-phase coil 11 and a dot-and-dash line "Lb" indicates the coil inductance of the B-phase coil 12.

It is known that in the claw-pole type permanent magnet (PM) stepping motor shown in FIG. 3, because the magnetic characteristics change due to the relationship between the phase of the magnetization of the rotor and the phase of the claw-pole, the coil inductance changes periodically according to the phase (electrical angle) of the rotor. The above characteristic of the stepping motor is referred to as the salient pole property.

Here, it is assumed that the coil inductance changes according to two periods of sine wave per electrical angle 360 degrees (a pitch of a magnetic pole pair of the rotor).

It should be noted that the change period, the change amount and the change pattern of the coil inductance are not limited to the above example.

Further, the motor structure which provides the inductance change shown in FIG. 4 is not limited to the claw-pole type. For example, it is known that a structure, in which a magnet is not disposed on the cylinder surface of the rotor but embedded inside the cylindrical conductor, also provides the inductance change according to the phase of the rotor. In the claw-pole type PM stepping motor, the winding of the coil and other motor elements can be simplified, and the claw-pole type PM stepping motor can be industrially produced inexpensively.

Figure 5A:
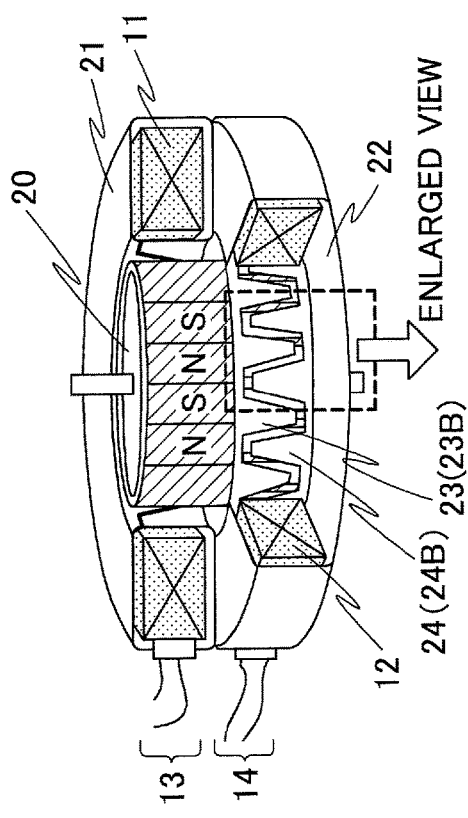
FIGS. 5A, 5B and 5C are drawings illustrating a conductor of a stepping motor according to the first embodiment.
Figure 5C:
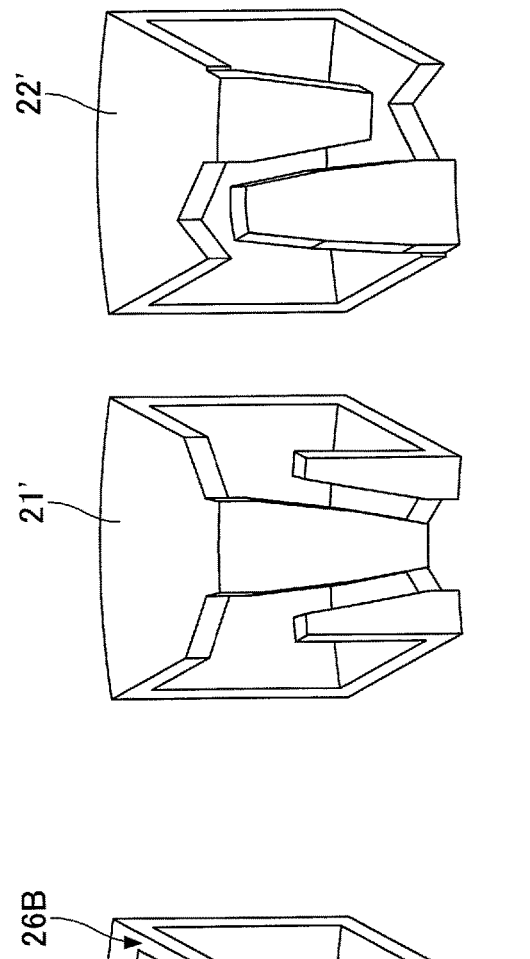
Figure 5B:
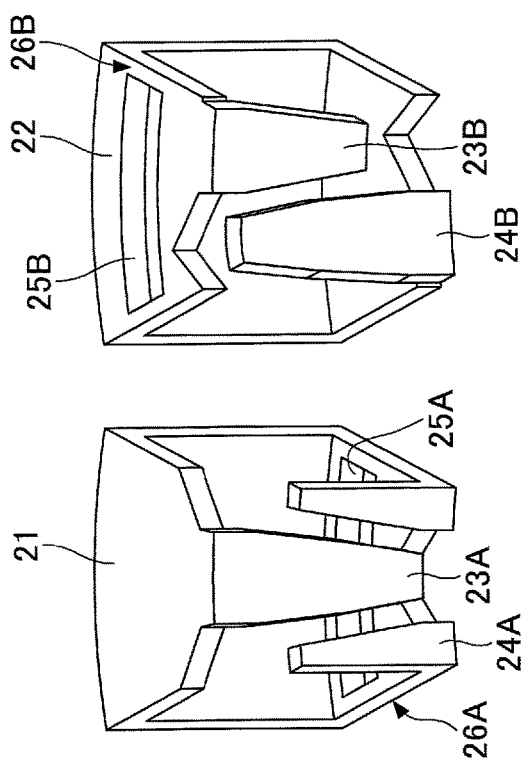

Next, referring to FIGS. 5A, 5B and 5C, the shape of the claw-pole of the motor 10 according to the present embodiment will be described. FIGS. 5A, 5B and 5C are drawings illustrating a conductor of a stepping motor according to the first embodiment. FIG. 5A illustrates a cross section of the motor 10 and FIG. 5B illustrates an enlarged view of a portion surrounded by a dotted line in FIG. 5A. FIG. 5C illustrates a conductor of a typical stepping motor as a comparative example of FIG. 5B.

As shown in FIG. 5B, the motor 10 according to the present embodiment has an opening portion (first opening portion) 25A in a joint surface 26A of the conductor 21 surrounding the A-phase coil 11, and the conductor 21 is joined to the conductor 22 via the joint surface 26A. Further, the motor 10 has an opening portion (second opening portion) 25B in a joint surface 26B of the conductor 22 surrounding the B-phase coil 12, and the conductor 22 is joined to the conductor 21 via the joint surface 26B.

In the present embodiment, the opening portion 25A and the opening portion 25B are formed in the same shape at the corresponding position of the joint surfaces 26A and 26B, and the opening portions 25A and 25B overlap each other when the conductors 21 and 22 are joined. Therefore, in the motor 10, when the conductors 21 and 22 are joined, a through hole is formed which penetrates conductors 21 and 22 through the opening portions 25A and 25B.

It should be noted that the same number of the opening portions 25A and 25B with the same pitch as the magnetized pole pairs of the rotor may be formed in the conductors 21 and 22.

On the other hand, in a typical stepping motor illustrated in FIG. 5C, there are no opening portions in the joint surfaces of a conductor 21' surrounding the A-phase coil and a conductor 22' surrounding the B-phase coil. Therefore, when the conductor 21' and the conductor 22' are joined, a through hole which penetrates the conductors 21' and 22' is not formed.

It should be noted that the positions and the shapes of the opening portions 25A and 25B may not be the same as long as the change of the self-inductance and the mutual inductance is close to a sine wave.

Further, in the motor 10 according to the present embodiment, two stators (two phases) having respective phase coils and conductors are stacked, but the number of stators is not limited to two. For example, three or more stators (phases) may be stacked and opening portions may be formed among the stators.

In the following, referring to FIG. 6, the self-inductance and the mutual inductance of the motor 10 according to the present embodiment and the self-inductance and the mutual inductance of the comparative motor will be described.

FIG. 6 is a drawing illustrating the self-inductance and the mutual inductance according to the first embodiment. FIG. 6(A) indicates the self-inductance and the mutual inductance of the motor 10 according to the present embodiment and FIG. 6(B) indicates the self-inductance and the mutual inductance of the comparative motor.

It can be seen that the amplitude change of the mutual inductance of the comparative motor with respect to the change of the rotor angle is very small compared to the change of the self-inductance (refer to FIG. 6(B)). On the other hand, the amplitude change of the mutual inductance of the motor 10 according to the present embodiment is about the same as the amplitude change of the self-inductance. Therefore, in the motor 10 according to the present embodiment, the salient pole property of the mutual inductance can be made stronger.

In the following, referring to FIGS. 7A, 7B and 7C, the reason why the amplitude change of the mutual inductance of the motor 10 according to the present embodiment can be made bigger will be described.

The mutual inductance in the present embodiment is considered from a relative magnetic permeability distribution in a rotor angle T1 where the self-inductance and the mutual inductance of the motor 10 is small and a relative magnetic permeability distribution in a rotor angle T2 where the self-inductance and the mutual inductance of the motor 10 is big.

FIGS. 7A, 7B and 7C are drawings illustrating a relative magnetic permeability distribution in a stepping motor according to the first embodiment. FIG. 7A is used for illustrating viewing directions of FIG. 7B and FIG. 7C. FIG. 7B illustrates a relative magnetic permeability distribution in the rotor angle T1 and FIG. 7C illustrates a relative magnetic permeability distribution in the rotor angle T2.

The relative magnetic permeability distributions illustrated in FIG. 7B and FIG. 7C are relative magnetic permeability distributions when the A-phase coil 11 and the conductor 21, and the B-phase coil 12 and the conductor 22 are observed from a direction illustrated by an arrow Y in FIG. 7A.

It can be seen that, in the rotor angle T1 illustrated in FIG. 7B, the relative magnetic permeability of a portion K1 surrounded by a dotted line in the figure is significantly low. As a result, with respect to the current flowing through the A-phase coil 11, the magnetic flux surrounding A-phase (arrow Y1) becomes small and the magnetic flux surrounding B-phase (arrow Y2) becomes big. As a result, in the rotor angle T1, the self-inductance of the motor 10 becomes small and the mutual inductance becomes big. It should be noted that the portion K1 is a portion where the conductor 21 and the conductor 22 are penetrated due to the opening portions 25A and 25B.

Further, it can be seen that, in the rotor angle T2, the relative magnetic permeability of the portion K1 is high. As a result, with respect to the current flowing through the A-phase coil 11, the magnetic flux surrounding A-phase (arrow Y1) becomes big and the magnetic flux surrounding B-phase (arrow Y2) becomes small. As a result, in the rotor angle T2, the self-inductance of the motor 10 becomes big and the mutual inductance becomes small.

As described above, in the present embodiment, by having the opening portions 25A and 25B in the joint surfaces 26A and 26B of the conductor 21 for the A-phase and the conductor 22 for the B-phase, the relative magnetic permeability is changed according to the rotor angle. Therefore, according to the present embodiment, the change width of the mutual inductance of the motor 10 can be made about the same as the change width of the self-inductance, and the salient pole property can be produced.

Figure 8:
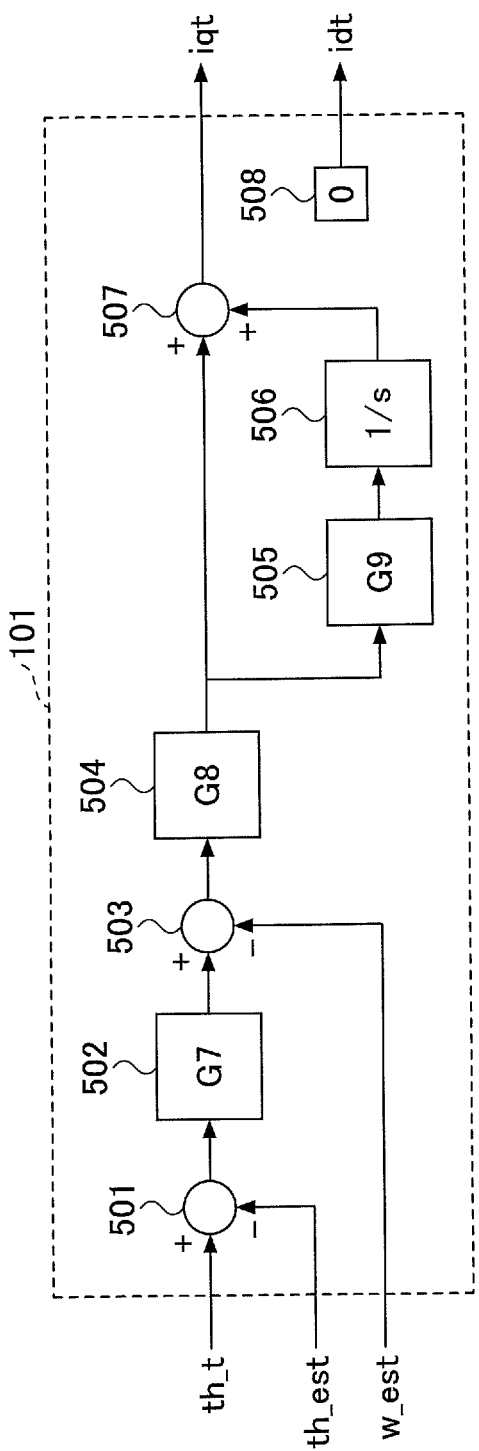
FIG. 8 is a drawing illustrating a position feedback control unit.

Next, the details of units included in the motor drive control apparatus 100 according to the present embodiment will be described. FIG. 8 is a drawing illustrating a position feedback control unit 101.

The position feedback control unit 101 according to the present embodiment includes subtracters 501 and 503, gain elements 502, 504 and 505, an integrator 506, an adder 507 and a fixed value generation unit 508.

The subtracter 501 subtracts position information (angle) "th_est" from a target position instruction value "th_t" input to the position feedback control unit 101. In other words, the subtracter 501 compares the target position of the rotor 20 with the estimated current position, and calculates a position error.

The gain element 502 amplifies the output (position error) of the subtracter 501 by a predetermined value G7 and provides the amplified value to the subtracter 503 in the subsequent stage. In the present embodiment, the output of the gain element 502 becomes a target speed of the rotor.

The subtracter 503 subtracts speed information "w_est" from the output of the gain element 502. The speed information "w_est" is speed information of the rotational speed of the rotor 20. In other words, the subtracter 503 compares the target rotational speed of the rotor 20 with the current rotational speed, and calculates a speed error.

The gain element 504 amplifies the output (speed error) of the subtracter 503 by a predetermined value G8. The speed error amplified by the gain element 504 is provided to the gain element 505 and to the adder 507.

The gain element 505 amplifies the output of the gain element 504 by a predetermined value G9 and provides the amplified value to the integrator 506. An output of the integrator 506 ("s" is a Laplace operator) is provided to the adder 507.

The adder 507 adds the output of the gain element 504 to the output of the integrator 506, performing the following operation for the speed error (which expresses a transfer function), and outputs an amplitude target value "iqt" of the drive current.

The operation will be described below.

The position error between the estimated current position of the rotor 20 and the target position=$th\_t-th\_est$ The target speed of the rotor 20=position error*$G7$ The speed error between the target speed of the rotor 20 and the current speed=the target speed− speed information $w\_est$ The amplitude target value of the drive current=the speed error*$G8*(1+G9*(1/s))$ In the present embodiment, with the above configuration, the rotational speed of the rotor 20 can be feedback-controlled in the inner loop of the position feedback control unit 101. Therefore, in the present embodiment, the position of the rotor 20 can be easily controlled and stabilized.

Further, because the feedback control of the rotational speed according to the present embodiment uses proportional integral control, a steady-state speed error does not occur and it is possible to perform accurate speed control. Further, in the present embodiment, when the position of the rotor 20 reaches the target position and the motor 10 remains stationary, the target speed becomes zero, and because the steady-state speed error does not occur, the deviation from the target position does not occur.

It should be noted that the amplitude target value "iqt" of the drive current may be calculated by using only amplification of the position error. In this case, the operation using the speed error is not required. In the case where the amplitude target value "iqt" is calculated by using only amplification of the position error, the amplitude target value "iqt" of the drive current may be calculated by applying, for example, a known PID (proportional, integral, differential) operation to the position error.

In the present embodiment, the target amplitude values "idt" and "iqt" correspond to a d-axis drive current and a q-axis drive current in the vector control. Further, because the q-axis drive current indicates a torque, it is known that, in a simplified control method, only the q-axis drive current is controlled and the d-axis drive current is fixed to zero. In the present embodiment, by using the above method, the target amplitude value "idt" of the d-axis drive current is fixed to zero by the fixed value generation unit 508.

Figure 9:
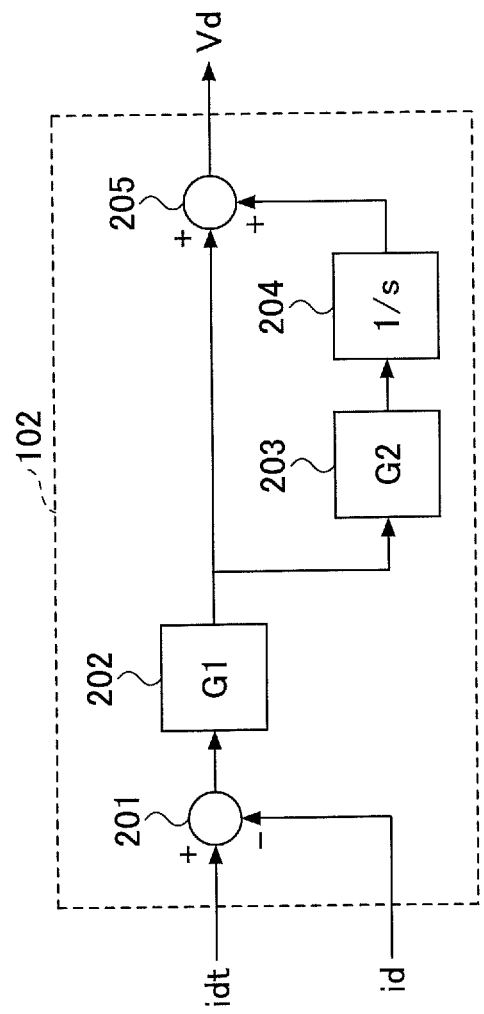
FIG. 9 is a drawing illustrating a d-axis current control unit.
Figure 10:
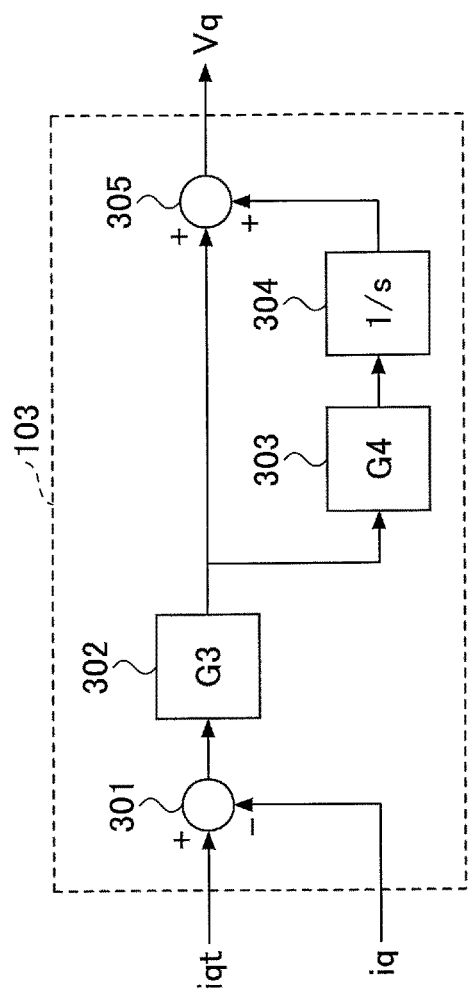
FIG. 10 is a drawing illustrating a q-axis current control unit.

Next, referring to FIG. 9 and FIG. 10, the d-axis current control unit 102 and the q-axis current control unit 103 will be described. FIG. 9 is a drawing illustrating the d-axis current control unit 102. FIG. 10 is a drawing illustrating the q-axis current control unit 103.

The d-axis current control unit 102 illustrated in FIG. 9 includes a subtracter 201, gain elements 202 and 203, an integrator 204, and an adder 205.

The q-axis current control unit 103 illustrated in FIG. 10 includes a subtracter 301, gain elements 302 and 303, an integrator 304, and an adder 305.

Because the operations of units illustrated in FIG. 9 and in FIG. 10 are the similar to the operations of units illustrated in FIG. 8, the descriptions are omitted.

It should be noted that the operations in FIG. 9 and FIG. 10 expressed in the transfer function representation are as follows, and the proportional and integral control is realized.

$$d\text{-axis drive voltage ``}Vd\text{''}=(\text{target amplitude value ``}idt\text{''}-d\text{-axis current vector ``}id\text{''})*G1*(1+G2*(1/s))$$

$$q\text{-axis drive voltage ``}Vq\text{''}=(\text{target amplitude value ``}iqt\text{''}-q\text{-axis current vector ``}iq\text{''})*G3*(1+G4*(1/s))$$

Next, referring to FIG. 11 through FIG. 13, the vector rotation unit 106 according to the present embodiment will be described.

Figure 11:
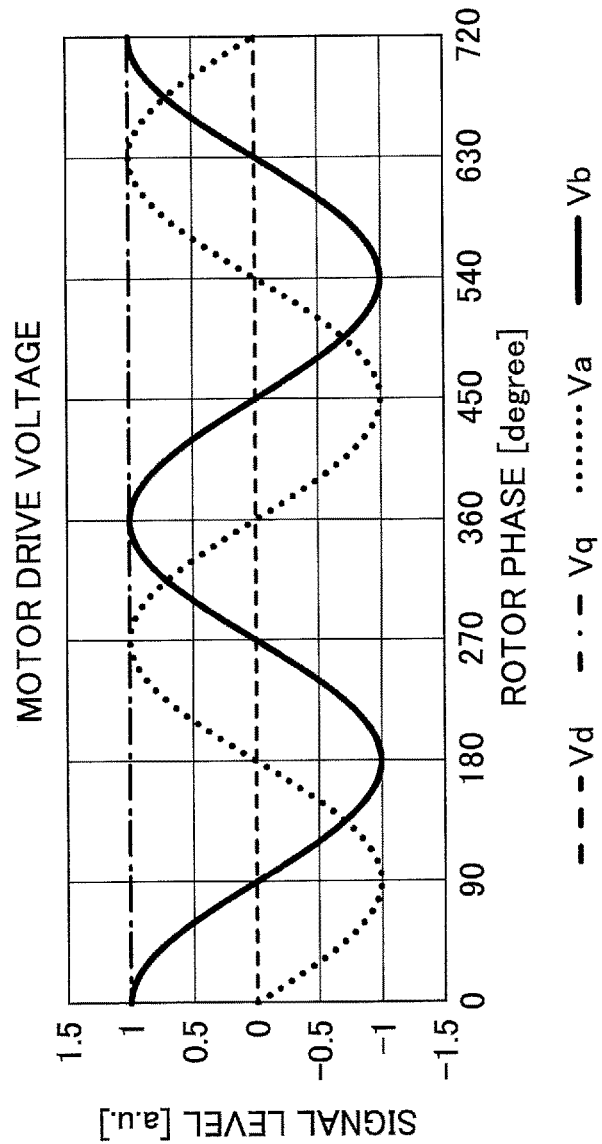
FIG. 11 is the first drawing illustrating an operation concept of a vector rotation unit.

FIG. 11 is the first drawing illustrating an operation concept of the vector rotation unit 106. FIG. 11 illustrates the operation concept of the vector rotation unit 106. In FIG. 11, the vertical axis indicates a voltage amplitude and the horizontal axis indicates the phase (electrical angle) of the rotor 20, "th". It should be noted that, in the present embodiment, although the phase actually used is not the phase of the rotor 20 itself, but the position information "th_est" estimated by the position estimation unit 104, and the position estimation unit 104 performs estimation in such a way that the position information "th_est"="th". Therefore, "th_est" and "th" are substantially the same.

In FIG. 11, a dashed line indicates the d-axis drive voltage "Vd". The drive voltage "Vd" shown in FIG. 11 is a signal to which the high-frequency signal "Vh" is not added.

In FIG. 11, if the drive voltage Vd=0, the drive voltage Vq=1 and the current is direct current, then the $A$-phase drive voltage vector $Va=-\sin(th)$ the $B$-phase drive voltage vector $Vb=\cos(th)$ The above indicates a phase relationship in which A-phase is advanced to B-phase by 90 degrees and zero degrees of A-phase corresponds to zero degrees of the reference phase (electrical angle) of the rotor. Further, in the case where the drive voltage Vd=0, amplitudes of the drive voltage vectors Va and Vb are determined by the level of the q-axis drive voltage Vq.

Figure 12:
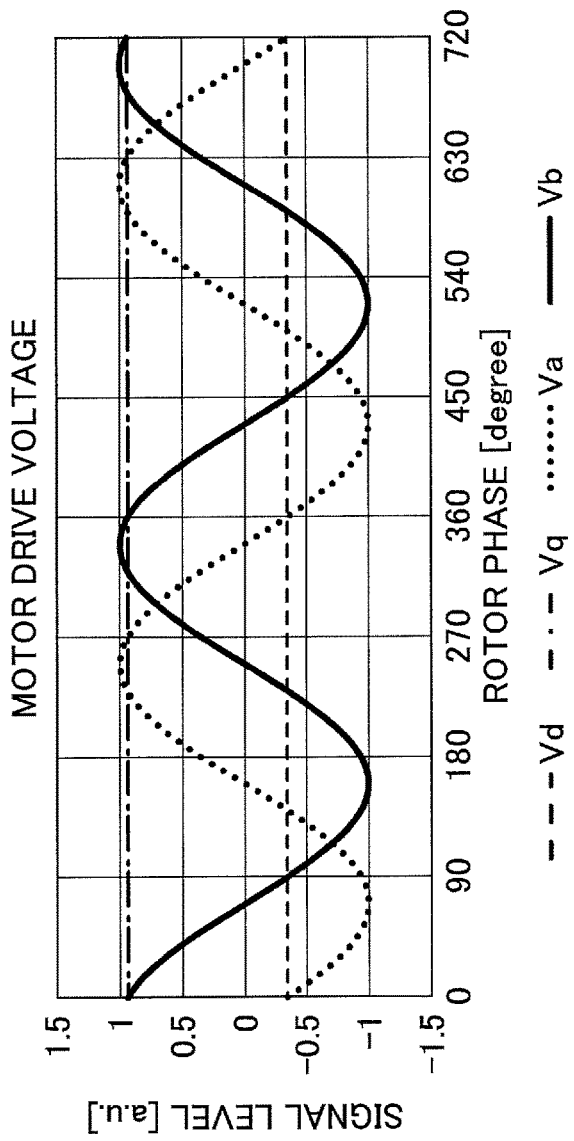
FIG. 12 is the second drawing illustrating an operation concept of a vector rotation unit.

FIG. 12 is the second drawing illustrating an operation concept of the vector rotation unit 106. In an example of FIG. 12, the drive voltage Vd=0.342 and the drive voltage Vq=0.940. It should be noted that the drive voltage "Vd" shown in FIG. 12 is a signal to which the high-frequency signal "Vh" is not added.

In an example of FIG. 12, it can be seen that the amplitudes of the drive voltage vectors Va and Vb are still 1, and A-phase is advanced by 20 degrees with respect to the reference phase of the rotor.

In the present embodiment, the relationship between the drive voltage Vd and the drive voltage Vq is controlled based on the relationship between the d-axis current vector id and the q-axis current vector iq in the d-axis current control unit 102 and the q-axis current control unit 103. Therefore, for example, when the rotational speed of the motor 10 increases and the phase delay of the detected currents ia and ib becomes greater, the drive voltages Vd and Vq are controlled to cause the phases of the A-phase drive voltage vector Va and the B-phase drive voltage vector Vb to be advanced. As a result, in the present embodiment, the reduced efficiency due to the increased rotational speed of the motor 10 can be suppressed. It should be noted that, the efficiency in the present embodiment is represented by a ratio of mechanical output to the input power provided for the motor 10.

Figure 13:
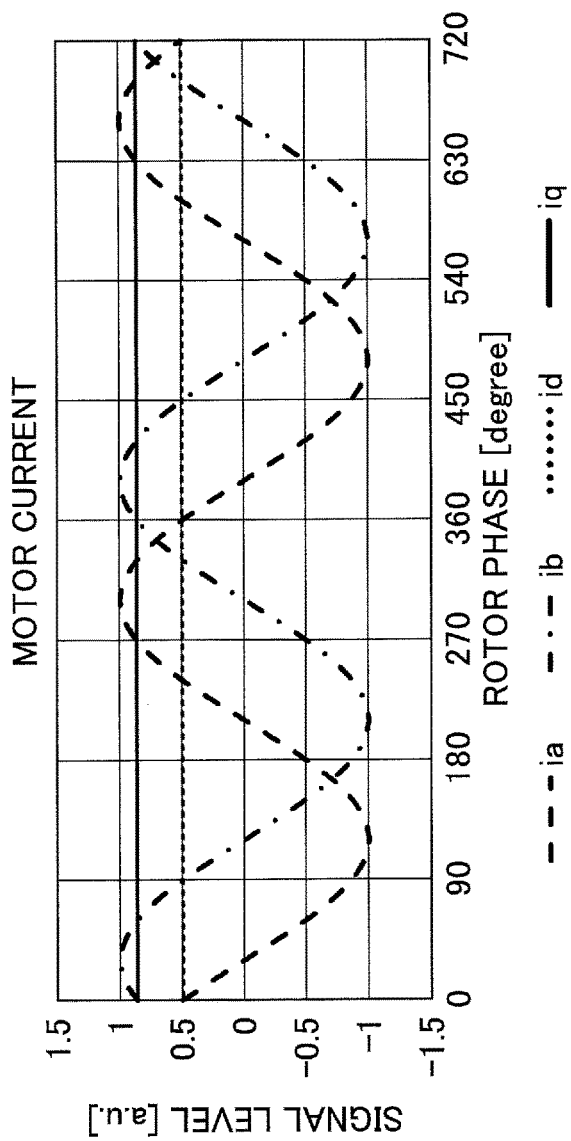
FIG. 13 is a drawing illustrating an operation concept of another vector rotation unit.

FIG. 13 is a drawing illustrating an operation concept of another vector rotation unit. FIG. 13 illustrates the operation concept of the vector rotation unit 107. In FIG. 13, the conditions are, similar to FIG. 12, the drive voltage Vd=0.342 and the drive voltage Vq=0.940.

FIG. 13 illustrates a case where the phases of the A-phase detected current ia and the B-phase detected current ib are delayed by 30 degrees (electrical angle) with respect to the reference phase of the rotor. At this time, d-axis current vector id=0.5, q-axis current vector iq=0.866 and the current is direct current.

Further, if the A-phase detected current ia and the B-phase detected current ib are delayed by 0 degrees with respect to the reference phase of the rotor 20, then id=0 and iq=1.

In other words, in the present embodiment, if the current is controlled to make id=0 (target amplitude value "idt" of the drive current=0), then the delay of the A-phase detected current ia and the B-phase detected current ib with respect to the reference phase of the rotor 20 can be controlled to be 0 degrees.

Further, in the present embodiment, by making the value of the d-axis current vector id (the value of the target amplitude value idt of the drive current) other than 0, the phase of the detected currents ia and ib can be shifted with respect to the reference phase of the rotor 20. Therefore, in the present embodiment, by shifting the phase of the detected currents ia and ib with respect to the reference phase of the rotor 20, the reluctance torque can be used and the power efficiency can be improved. It should be noted that the reluctance torque is a torque generated when the coil electromagnet and the conductor of the rotor attract each other.

As described above, in the present embodiment, the phases of the detected currents ia and ib can be controlled to be in a certain relationship with the reference phase of the rotor 20 by using the d-axis current control unit 102, the q-axis current control unit 103, the vector rotation unit 106 and the vector rotation unit 107.

Further, in the present embodiment, by converting the detected currents ia and ib, which are alternating currents, to direct currents (low-frequency), it becomes possible to make the current control band be low-frequency. For example, in the case of controlling the detected currents ia and ib, which are alternating currents, to follow the target signal, the current must be controlled in a band sufficiently higher than the frequency of the alternating currents ia and ib. In this case, the cost is high. On the other hand, in the present embodiment, as described above, it is possible to make the band for controlling the current be low-frequency, and the cost can be reduced.

Figure 14:
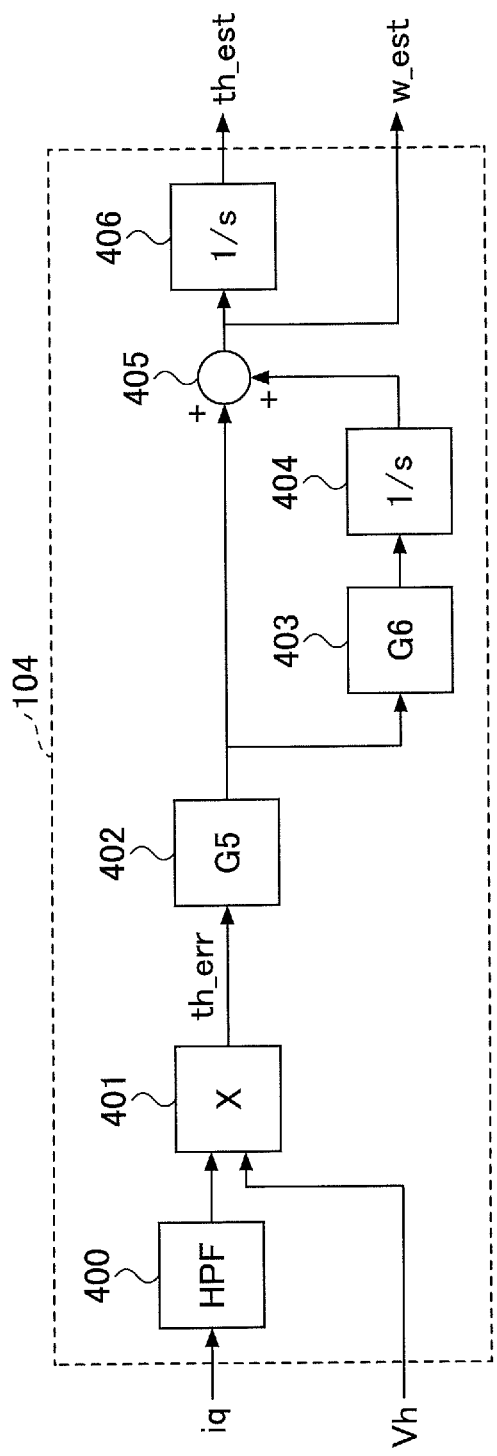
FIG. 14 is a drawing illustrating a position estimation unit.

Next, referring to FIG. 14 and FIG. 15, the position estimation unit 104 according to the present embodiment will be described. FIG. 14 is a drawing illustrating the position estimation unit 104.

The position estimation unit 104 includes a high-pass filter 400, a multiplier 401, gain elements 402 and 403, integrators 404 and 406, and an adder 405.

In the present embodiment, observing the q-axis current vector "iq", the high-frequency signal "Vh" which is superimposed on the d-axis drive voltage "Vd" is shown in the following formula 4.

$$iq = K*Vh*\sin(2*(th-th\_est)) + (\text{drive signal component}) \quad \text{(formula 4)}$$

Here, K is a constant determined from motor characteristics, a circuit constant, etc., Vh is a high-frequency signal which is superimposed on the drive voltage Vd, th is an electrical angle indicating a current position of the rotor 20, and th_est is position information (electrical angle) indicating an estimated position of the rotor 20.

In formula 4, the first term is a component where the high-frequency component is AM (Amplitude Modulation)-modulated by the estimated error. The estimated error is the current position of the rotor 20 minus the estimated position of the rotor 20, which is indicated by $\sin(2*(th-th\_est))$.

Further, the second term is a motor drive signal component which controls driving of the motor 10. Therefore, the estimated position of the rotor 20 can be obtained by extracting (demodulating) the estimated error from the first term.

In the position estimation unit 104 according to the present embodiment, the high-pass filter 400 allows only the high-frequency component of the q-axis current vector iq provided by the vector rotation unit 107 to pass. By the above operation, the motor drive signal component of the second term of the formula 4 is removed and only the first term remains.

In the position estimation unit 104, the multiplier 401 multiplies the high-frequency component of the q-axis drive current vector iq by the high frequency signal Vh provided by the high frequency generation unit 108, and outputs the estimated position error th_err.

In the estimated position error th_err, the high-frequency component is included, and the estimated error $\sin(2*(th-th\_est))$ is included in the low-frequency component. Therefore, in the present embodiment, in the position estimation unit 104, it is only required to extract the low-frequency component of the estimated position error th_err.

The position estimation unit 104 performs PI (proportional and integral) control by using the gain elements 402 and 403, the integrator 404 and the adder 405. Further, the position estimation unit 104 outputs the output signal of the adder 405 as the estimated speed w_est.

Further, the output of the adder 405 is supplied to the integrator 406. The integrator 406 integrates the estimated speed w_est, and the output of the integrator 406 is output as the position information th_est. The position information th_est is an electrical angle indicating an estimated current position of the rotor 20.

The above described electrical angle is indicated as follows by using transfer function.

$$w\_est = th\_err * G5 * (1 + G6 * (1/s))$$

$$th\_est = w\_est * (1/s)$$

In the position estimation unit 104, because th_est is supplied to the vector rotation unit 106, th_est is fed back to the first term of formula 4. Therefore, the portion from the gain element 402 to the integrator 406 in the position estimation unit 104 plays a function of a control unit which performs the feedback control related to the position estimation calculation. In the present embodiment, because the control unit itself plays a function of a low pass filter, the high-frequency component included in the estimated position error th_err is removed.

Figure 15:
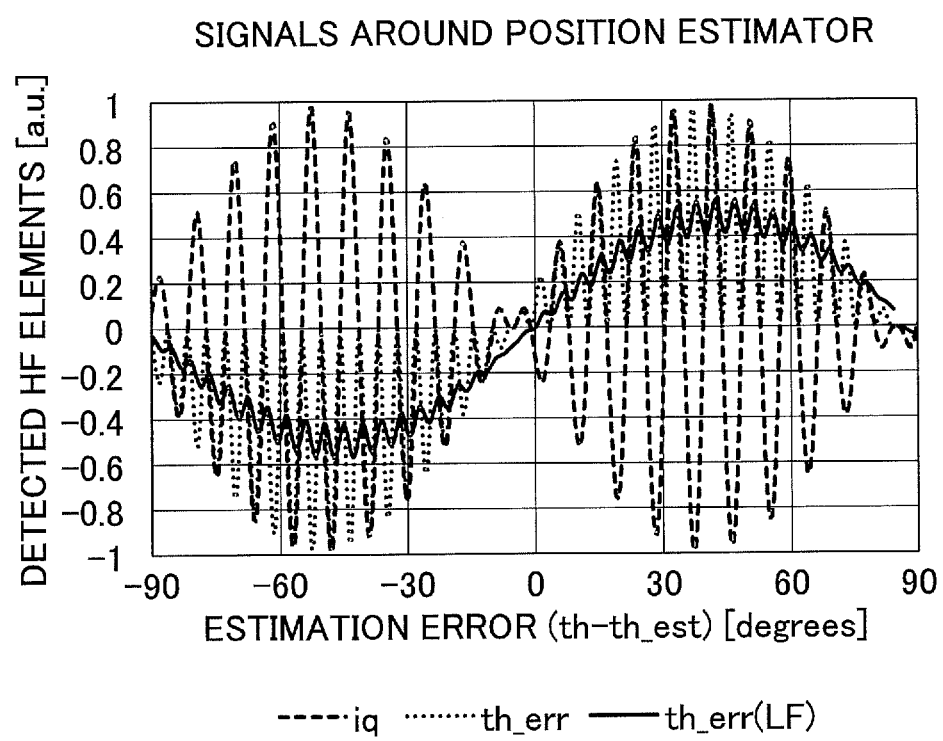
FIG. 15 is a drawing illustrating an example of a q-axis current vector and a signal waveform of an estimation position error th_err.

FIG. 15 is a drawing illustrating an example of a q-axis current vector and a signal waveform of an estimation position error th_err.

In FIG. 15, the horizontal axis is the error (th−th_est) (electrical angle). In FIG. 15, it is assumed that the drive signal component (the second term of formula 4) of the q-axis current vector iq has already been removed.

In FIG. 15, a dashed line indicates a high-frequency component (response signal) of the q-axis current vector iq, in which component the high-frequency signal Vh is AM modulated by estimated error $\sin(2*(th-th\_est))$.

In FIG. 15, a dotted line indicates an estimated position error th_err, which is a result of multiplying the high-frequency component of the q-axis current vector iq by the high-frequency signal Vh.

It can be seen in FIG. 15 that the high-frequency component remains in the estimated position error th_err, the estimated position error th_err has a positive value when the error (th−th_est) has a positive value, and the estimated position error th_err has a negative value when the error (th−th_est) has a negative value. It should be noted that the error (th−th_est) equals the current position of the rotor 20 minus the estimated position of the rotor 20 estimated by the position estimation unit 104, and indicates the error between the position of the rotor 20 estimated 20 by the position estimation unit 104 and the actual position of the rotor 20.

Therefore, in FIG. 15, when the error (th−th_est) coincides with the estimated position error th_err, it is indicated that the estimated position of the rotor 20 coincides the current position of the rotor 20.

As described above, in the present embodiment, by using the estimated position error th_err in the feedback control of the subsequent stage in the position estimation unit 104, the error between the estimated position of the rotor 20 estimated by the position estimation unit 104 and the actual position of the rotor 20, i.e., the estimated position error, can be made zero. Therefore, the position estimation unit 104 according to the present embodiment is capable of converging the position information th_est of the rotor 20 into a position where the positions (the estimated position of the rotor 20 estimated by the position estimation unit 104 and the actual position of the rotor 20) coincide with each other.

In FIG. 15, a solid line indicates a case where it is assumed that the estimated position error th_err is filtered by a low pass filter (LPF). It can be seen that the solid line is, although a high-frequency component remains, very close to a shape of the estimated error, $\sin(2*(th-th\_est))$. In the present embodiment, because the feedback control including the gain element 402 through the integrator 406 of the position estimation unit 104 plays a function of low pass filter, the high-frequency component is removed as shown in the solid line.

It should be noted that it is assumed but is not limited that the position estimation unit 104 according to the present embodiment includes the high-pass filter 400. The position estimation unit 104 may not include the high-pass filter 400.

In the case where the position estimation unit 104 does not include the high-pass filter 400, the estimated position error th_err is indicated by the following formula 5.

Estimated position error $th\_err = K \cdot Vh^2 \cdot \sin(2 \cdot (th - th\_est)) + Vh \cdot \text{drive signal component}$   (formula 5)

In formula 5, the first term is similar to the case where the high-pass filter is included, the estimated error sin(2*(th-th_est)) is included in the low-frequency component of the first term. The second term of formula 5 is a high-frequency component because the high-frequency signal Vh is multiplied, and is removed by the above-described function of the low-pass filter included in the position estimation unit 104.

As described above, in the present embodiment, it is not required for the high-pass filter 400 to be included, but from the following aspect, it is preferable for the high-pass filter 400 to be included.

In the present embodiment, in the case where the high-pass filter 400 is not included, it is required for the parts of the position estimation unit 104 other than the high-pass filter 400 to perform controlling the wideband signals from the high frequency to low frequency. In this case, there may be various kinds of limitations in, for example, designing gain elements or the like in the feedback control of the position estimation unit 104.

On the other hand, if the high-pass filter is included, the drive signal component can be reduced beforehand, the freedom in designing the feedback control is expanded, and the estimation accuracy of the position of the rotor 20 as a whole can be improved.

Further, in the case where the high-frequency signal Vh according to the present embodiment is a square wave, by sampling the q-axis current vector iq at both edges of the high-frequency signal Vh, the q-axis current vector iq can be made a square shape. Therefore, in this case, the estimated error can be extracted without using a filter. Here, the high-frequency signal Vh of the square wave having amplitude 1 is indicated as follows.

$Vh = (-1)n$

Here, "n" is a sample number (0, 1, 2, 3, . . . ). Therefore, the first term of the sampled q-axis current vector iq is indicated as follows.

$iq = K \cdot (-1)n \cdot \sin(2 \cdot (th - th\_est))$ when the above is multiplied by the high-frequency signal Vh (square wave), the estimated position error $th\_err = K \cdot \sin(2 \cdot (th - th\_est))$.

As a result, the estimated position error can be extracted without passing through the low-pass filter or the like. Further, it is easy to generate this kind of square wave, it is easy to perform multiplication by using only plus-minus logic, and it is possible to provide low-cost and high-speed processing.

Figure 16:
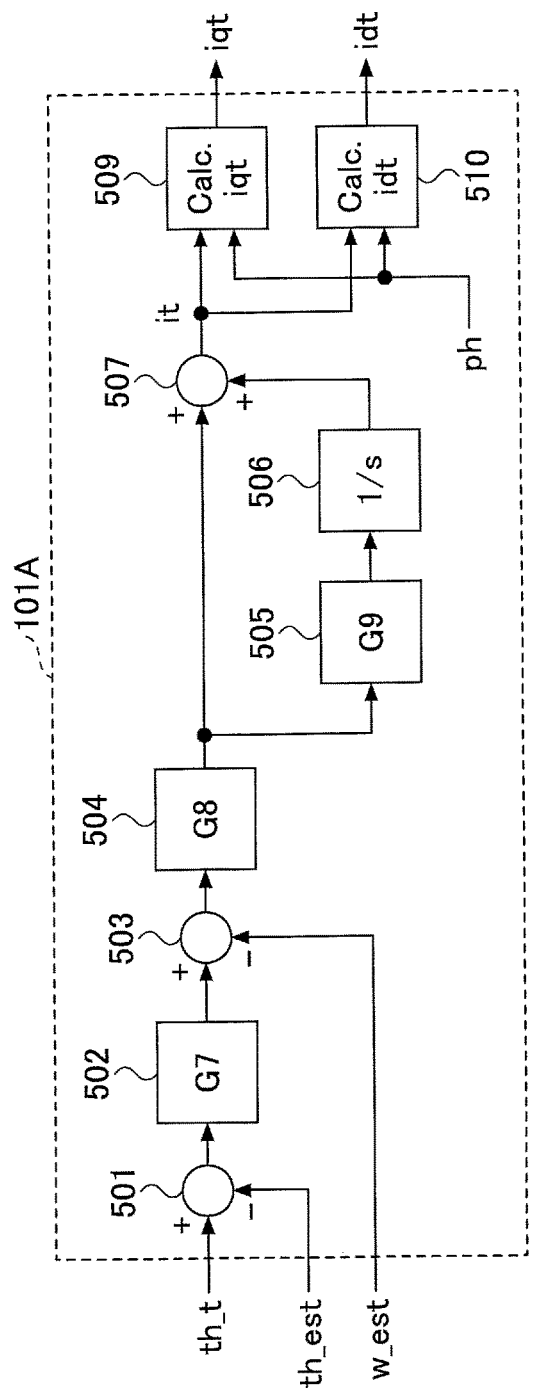
FIG. 16 is a drawing illustrating another example of a position feedback control unit.

Next, referring to FIG. 16, a modified example of the position feedback control unit 101 according to the present embodiment will be described. FIG. 16 is a drawing illustrating another example of a position feedback control unit 101A.

The position feedback control unit 101A includes, in addition to units included in the position feedback control unit 101 except for the fixed value generation unit 508, a q-axis target current calculation unit 509 and a d-axis target current calculation unit 510.

The q-axis target current calculation unit 509 calculates the amplitude target value "iqt" of the q-axis drive current according to the target current amplitude "it" which is an output of the adder 507 and a target phase "ph". The calculation in the q-axis target current calculation unit 509 is indicated as follows.

amplitude target value $iqt = it \cdot \tan(ph)/\sqrt{1 + \tan(ph)^2}$

The d-axis target current calculation unit 510 calculates the amplitude target value "idt" of the d-axis drive current according to the target current amplitude "it" which is the output of the adder 507 and the target phase "ph". The calculation in the d-axis target current calculation unit 510 is indicated as follows.

Amplitude target value $idt = it/\sqrt{1 + \tan(ph)^2}$

It should be noted that the target phase "ph" in FIG. 16 is a phase difference (advanced angle) between the reference phase of the A-phase detected-current-vector is and the B-phase detected-current-vector ib and the reference phase of the rotor 20.

In the above formula, a portion right from "it" of the right side of the formula can be calculated beforehand if the target phase ph is determined, and thus, it is easy to implement. In the present embodiment, as described above, by shifting the target phase ph, it is possible to provide a highly efficient operation in a motor or the like in which the reluctance torque can be used.

As described above, in the motor drive control apparatus 100 according to the present embodiment, by using the position estimation unit 104, a position of the rotor of the motor 10 is estimated according to the response signal of the high-frequency component detected by the current sensors 111 and 112. The above response signal is a response signal whose carrier is the high-frequency signal Vh and which is superimposed by the drive signal provided for driving the motor 10.

Therefore, in the motor drive control apparatus 100 according to the present embodiment, even if it is a weak signal supplied to the motor 10, which is difficult to be detected by the current sensors 111 and 112, the response signal of a high-frequency component can be detected, and the position of the rotor 20 can be estimated.

As described above, according to the present embodiment, even in the case where, for example, the rotation of the motor 10 is stopped or where the rotational speed is low, the closed-loop control can be maintained and the power consumed for performing the open-loop control can be reduced.

Further, in the present embodiment, even if the motor 10 is a stepping motor, the drive current can be controlled in all the speed area according to the load, occurrence of stepping out of the motor 10 can be avoided, and the motor 10 can be driven efficiently.

Second Embodiment

In the following, a second embodiment will be described referring to the accompanied drawings. In the second embodiment, the position of the opening portion formed in the conductor surrounding the coil of each phase is further specified than the first embodiment. In the following description of the second embodiment, the same numerical references are given to those having the same configurations as the first embodiment, and the detailed description is omitted.

Figure 17:
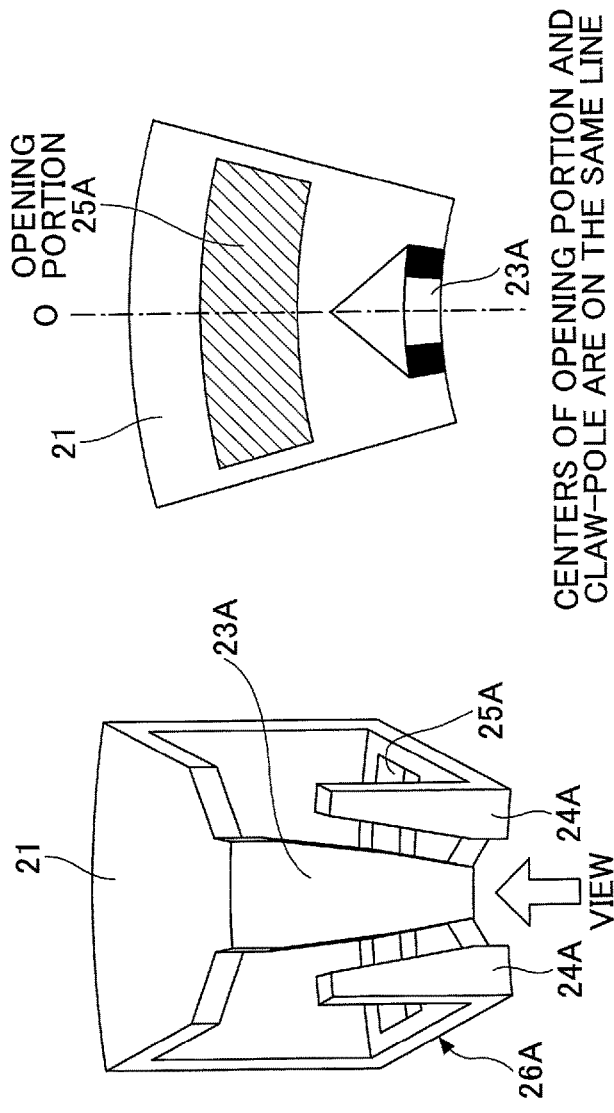
FIG. 17 is a drawing illustrating a conductor of a stepping motor according to the second embodiment.

FIG. 17 is a drawing illustrating a conductor of a stepping motor according to the second embodiment.

In the present embodiment, the opening portion 25A is formed in such a way that the center "O" of the opening portion 25A formed in the conductor 21 and the center "O" of the claw-pole 23A are on the same straight line. It should be noted that the opening portion 25B formed in the conductor 22 may be formed in such a way that the center "O" of the opening portion 25B and the center "O" of the claw-pole 23A are on the same straight line when the conductor 21 and the conductor 22 are joined.

Figure 18A:
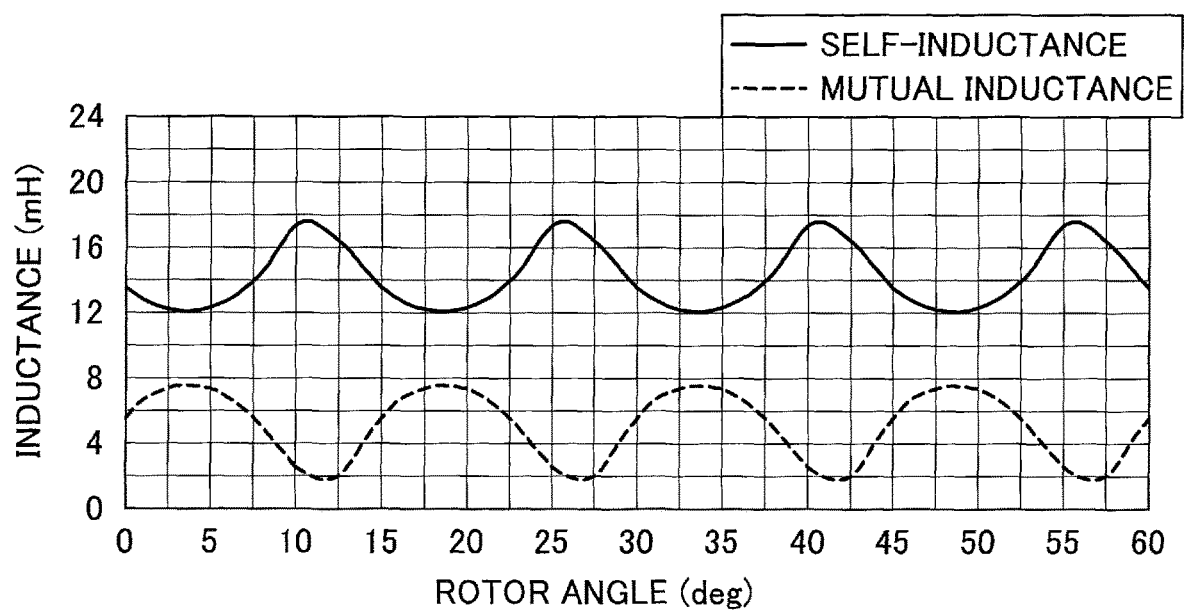
FIGS. 18A and 18B are drawings illustrating self-inductance and mutual inductance according to the second embodiment.
Figure 18B:
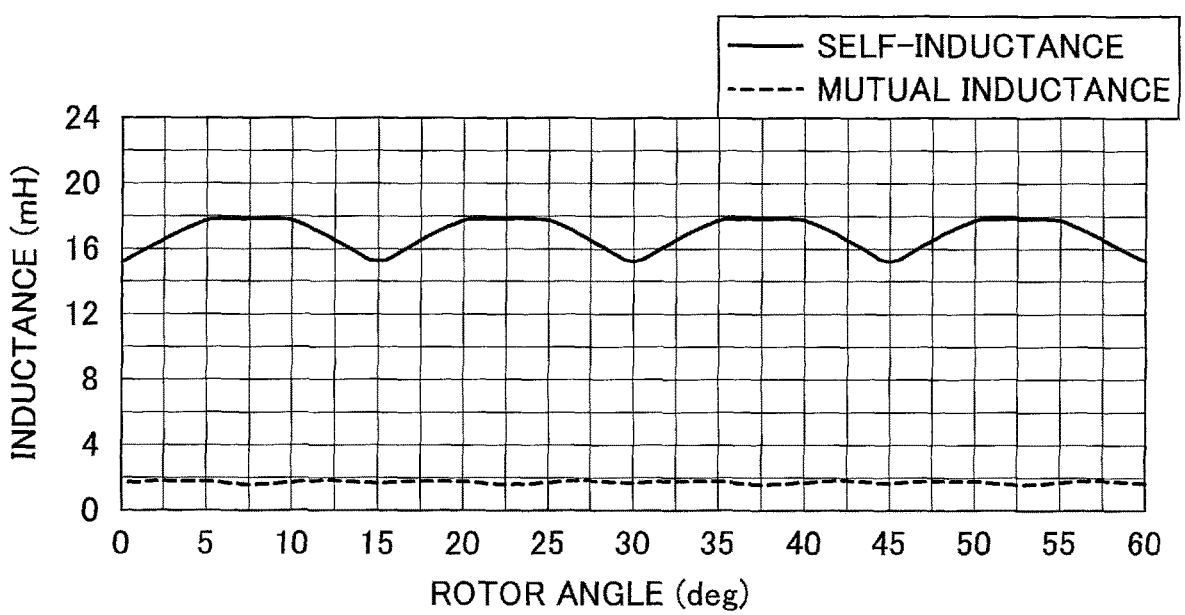

FIGS. 18A and 18B are drawings illustrating a self-inductance and a mutual inductance according to the second embodiment. FIG. 18A indicates the self-inductance and the mutual inductance of the motor 10 according to the present embodiment and FIG. 18B indicates the self-inductance and the mutual inductance of the comparative motor.

In the present embodiment, compared to the motor of the comparative example, the change width of the mutual inductance is wider. Further, in the present embodiment, the waveform of the mutual inductance is, compared to the first embodiment shown in FIG. 6, closer to a sine wave.

The reason why the waveform is closer to a sine wave can be considered that, in the present embodiment, by forming the opening portion 25A in such a way that the center of the opening portion 25A and the center of the claw-pole 23A are on the same straight line, the relative magnetic permeability distribution becomes symmetrical to the center of the claw-pole 23A.

Third Embodiment

In the following, a third embodiment will be described referring to the accompanied drawings. In the third embodiment, a shape of the opening portion formed in the conductor surrounding the coil of each phase is different from the shapes of the opening portion of the first and the second embodiments. In the following description of the third embodiment, the same numerical references are given to those having the same functions as the first embodiment, and the detailed description is omitted.

Figure 19:
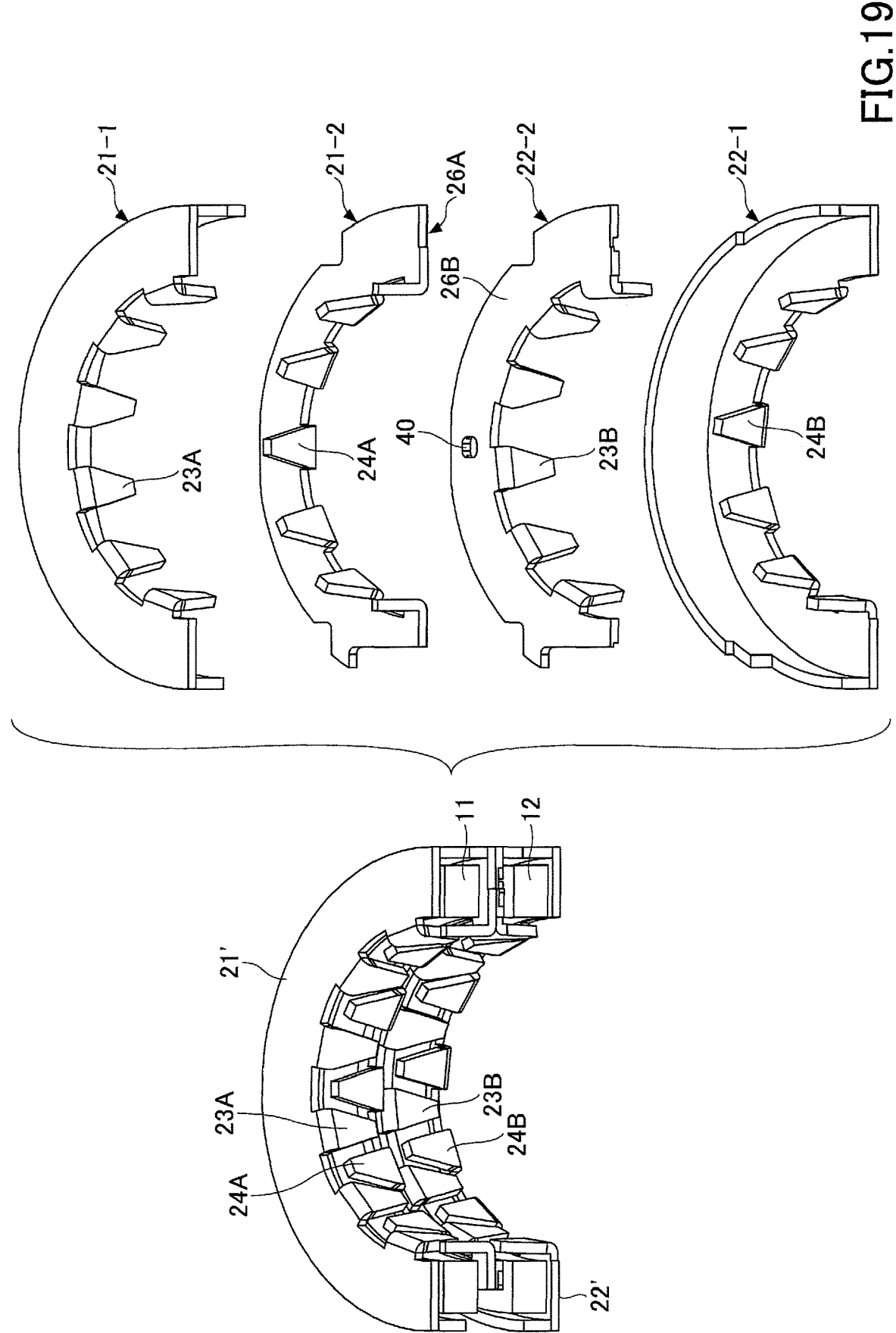
FIG. 19 is a drawing illustrating a conductor of a stepping motor.

FIG. 19 is a drawing illustrating a conductor of a stepping motor. FIG. 19 shows a conductor of a typical stepping motor as an comparative example of a conductor of a stepping motor according to the present embodiment.

In the stepping motor in FIG. 19, a conductor (ring-shaped claw-pole unit) 21' surrounding an A-phase coil 11 is formed by an outer yoke 21'-1 and an inner yoke 21'-2. Further, similarly, a conductor 22' surrounding a B-phase coil 12 is formed by an outer yoke 22'-1 and an inner yoke 22'-2.

Further, in an example shown in FIG. 19, in the inner yokes 21'-2 and 22'-2, opening portions 40 for positioning are formed. The opening portions 40 for positioning may or may not be formed in each of the inner yokes 21'-2 and 22'-2. Further, the positions where the opening portions 40 for positioning are formed are not limited to the positions shown in FIG. 19.

In the present embodiment, a plurality of opening portions are formed in a joint surface 26A, to be joined with the conductor 22, of the inner yoke 21'-2 of the conductor 21', a plurality of opening portions are formed in a joint surface 26B, to be joined with the conductor 21', of the inner yoke 22'-2 of the conductor 22', and magnetic-path-narrowing portions are formed between the opening portions. In the following, referring to FIGS. 20A and 20B, the conductors 21 and 22 according to the present embodiment will be described.

Figure 20A:
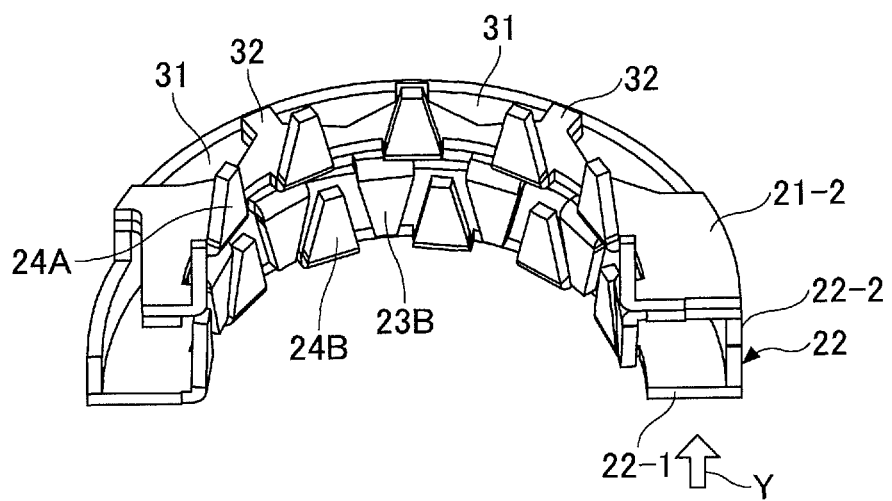
FIGS. 20A and 20B are drawings illustrating a conductor of a stepping motor according to the third embodiment.
Figure 20B:
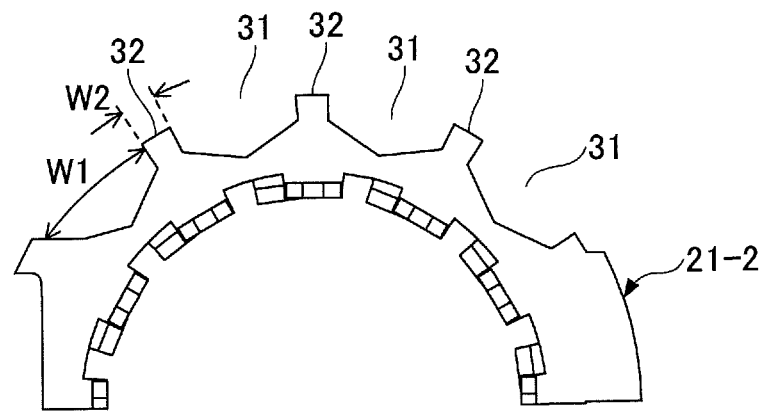

FIGS. 20A and 20B are drawings illustrating a conductor of a stepping motor according to the third embodiment. FIG. 20A is a perspective view of the conductor according to the present embodiment, and FIG. 20B is a plan view of the inner yoke 21-2.

In FIG. 20A, in order to describe the opening portion, the outer yoke 21-1 of the conductor 21 of the A-phase is omitted. Further, FIG. 20B is a plan view of the inner yoke 21-2 of the conductor 21.

In the present embodiment, a plurality of opening portions 31 are formed in the outer edge portions of the inner yokes 21-2 and 22-2, and magnetic-path-narrowing portions 32 are formed between the opening portions 31. In the following, the opening portions 31 and the magnetic-path-narrowing portions 32 of the inner yoke 21-2 of the conductor 21 will be described. The similar opening portions 31 and the magnetic-path-narrowing portions 32 are formed in the inner yoke 22-2 of the conductor 22.

In the present embodiment, the opening portion 31 is formed in such a way that, when a width of the opening portion 31 of the inner yoke 21-2 in a circumferential direction is denoted as W1 and a width of the magnetic-path-narrowing portions 32 of the inner yoke 21-2 in the circumferential direction is denoted as W2, W1>W2. It should be noted that the width W1 and the width W2 are the widths in the same circumference of the inner yoke 21-2.

When the conductor 21 is put on the conductor 22 and the joint surface 26A and the joint surface 26B are joined, a through hole penetrating the conductors 21 and 22 is formed by the opening portion 31 formed in the inner yoke 21-2 and the opening portion 31 formed in the inner yoke 22-2. Therefore, when the joint surface 26A and the joint surface 26B are joined, the magnetic-path-narrowing portions 32 formed in the inner yoke 21-2 and the magnetic-path-narrowing portions 32 formed in the inner yoke 22-2 are overlapped.

In the present embodiment, by making the shapes of the conductors 21 and 22 as shown in FIGS. 20A and 20B, it is possible to make a change width of a mutual inductance large.

It should be noted that, in the present embodiment, material of a rotor magnet 20A may be ferrite and material of the conductors 21 and 22 may be SECC (Steel, Electrogalvanized, Cold rolled, Commercial quality) steel plate.

It should be noted that the shape of the opening portion 31 has, but is not limited to, a corner. The opening portion 31 of the present embodiment may have, for example, a semicircle shape formed in the outer edge portion of the inner yoke 21-2. The opening portion 31 of the present embodiment may be formed in any way as long as it is formed in the outer edge portion and the relation between the width W1 of the opening portion 31 and the width W2 of the magnetic-path-narrowing portions 32 satisfies W1>W2.

Figure 21:
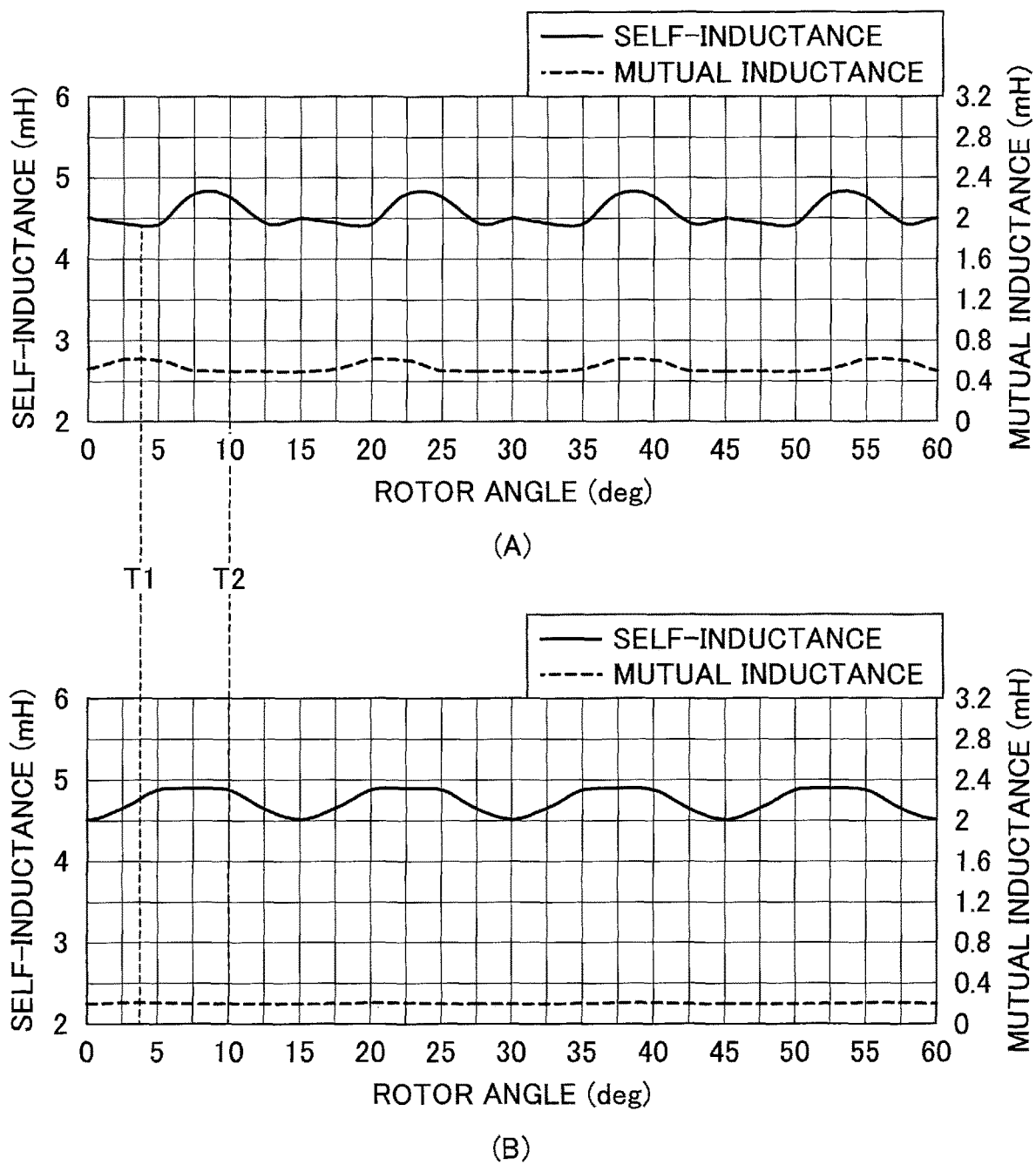
FIG. 21 is a drawing illustrating self-inductance and mutual inductance according to the third embodiment.

FIG. 21 is a drawing illustrating self-inductance and mutual inductance according to the third embodiment. FIG. 21(A) is a drawing illustrating the self-inductance and the mutual inductance of a motor according to the present embodiment, and FIG. 21(B) is a drawing illustrating the self-inductance and the mutual inductance of a motor of a comparative example.

It can be seen that the change of the mutual inductance of the comparative motor with respect to the change of the rotor angle is very small compared to the change of the self-inductance (refer to FIG. 21(B)).

On the other hand, the change of the mutual inductance of the motor according to the present embodiment is larger than the change of the mutual inductance of a motor of a comparative example. Therefore, in the motor according to the present embodiment, it is possible to make the salient pole property of the mutual inductance stronger.

In the following, referring to FIGS. 22A and 22B, the reason why the change of the mutual inductance of the motor according to the present embodiment becomes larger will be described.

Figure 22A:
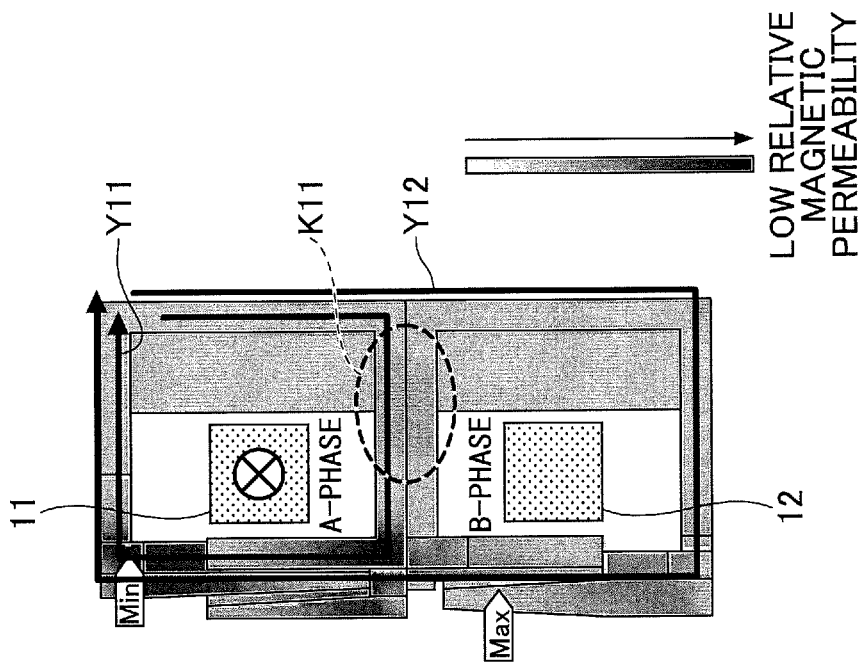
FIGS. 22A and 22B are drawings illustrating a relative magnetic permeability distribution in a stepping motor according to the third embodiment.
Figure 22B:
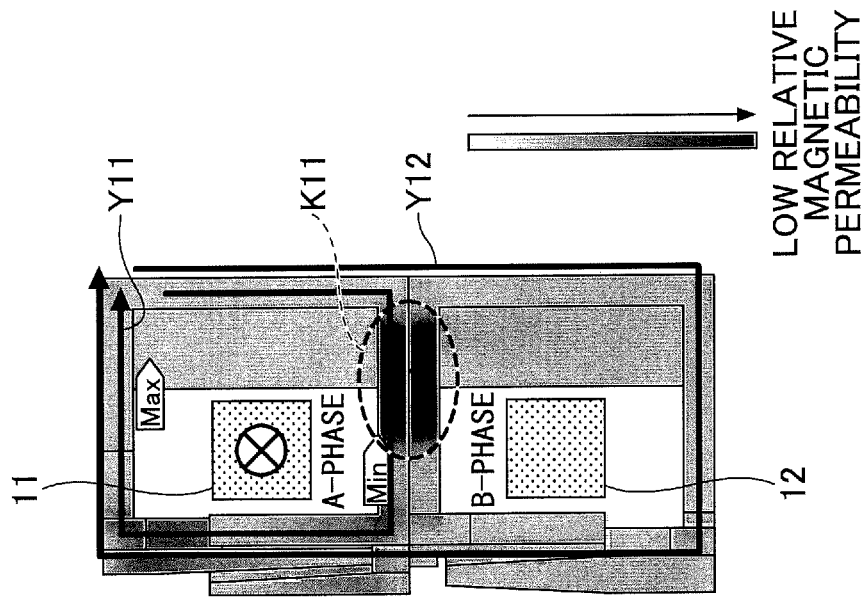

FIGS. 22A and 22B are drawings illustrating a relative magnetic permeability distribution in a stepping motor according to the third embodiment. FIG. 22A shows a relative magnetic permeability distribution at a rotor angle T1, and FIG. 22B shows a relative magnetic permeability distribution at a rotor angle T2. It should be noted that the relative magnetic permeability distributions illustrated in FIG. 22A and FIG. 22B are relative magnetic permeability distributions when the A-phase coil 11 and the conductor 21, and the B-phase coil 12 and the conductor 22 are observed from a direction illustrated by an arrow Y in FIG. 20A.

It can be seen that, at the rotor angle T1 illustrated in FIG. 22A, the relative magnetic permeability of a portion K11 surrounded by a dotted line in the figure is significantly low. This is due to the fact that, by having an opening portion 31, the magnetic flux is concentrated in the magnetic-path-narrowing portions 32 formed adjacent to the opening portion 31. As a result, in the present embodiment, with respect to the current flowing through the A-phase coil 11, the magnetic flux surrounding A-phase (arrow Y11) becomes small and the magnetic flux surrounding B-phase (arrow Y12) becomes large. As a result, in the rotor angle T1, the self-inductance of the motor becomes small and the mutual inductance becomes large. It should be noted that the portion K11 is a portion where the conductor 21 and the conductor 22 are penetrated due to the opening portion 31.

Further, it can be seen that, at the rotor angle T2, the relative magnetic permeability of the portion K11 is high. As a result, with respect to the current flowing through the A-phase coil 11, the magnetic flux surrounding A-phase (arrow Y11) becomes large and the magnetic flux surrounding B-phase (arrow Y12) becomes small. As a result, at the rotor angle T2, the self-inductance of the motor becomes large and the mutual inductance becomes small.

As described above, in the present embodiment, by having the opening portions 31 in the joint surfaces 26A and 26B of the conductor 21 for the A-phase and the conductor 22 for the B-phase, the relative magnetic permeability is changed according to the rotor angle. Therefore, according to the present embodiment, the change amount of the mutual inductance of the motor can be made about the same as the change amount of the self-inductance, and the salient pole property can be produced.

Figure 23B:
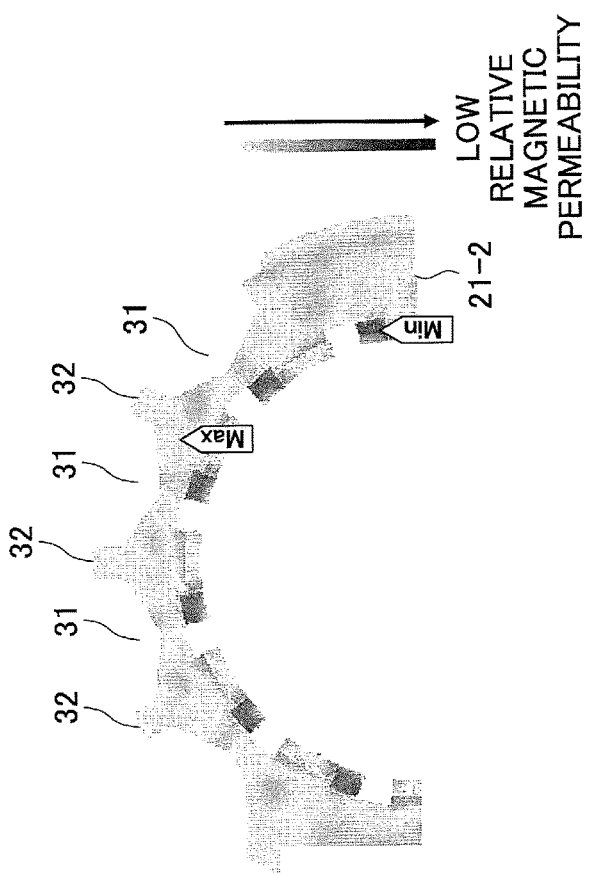
FIGS. 23A and 23B are drawings illustrating a relative magnetic permeability distribution in an inner yoke according to the third embodiment.
Figure 23A:
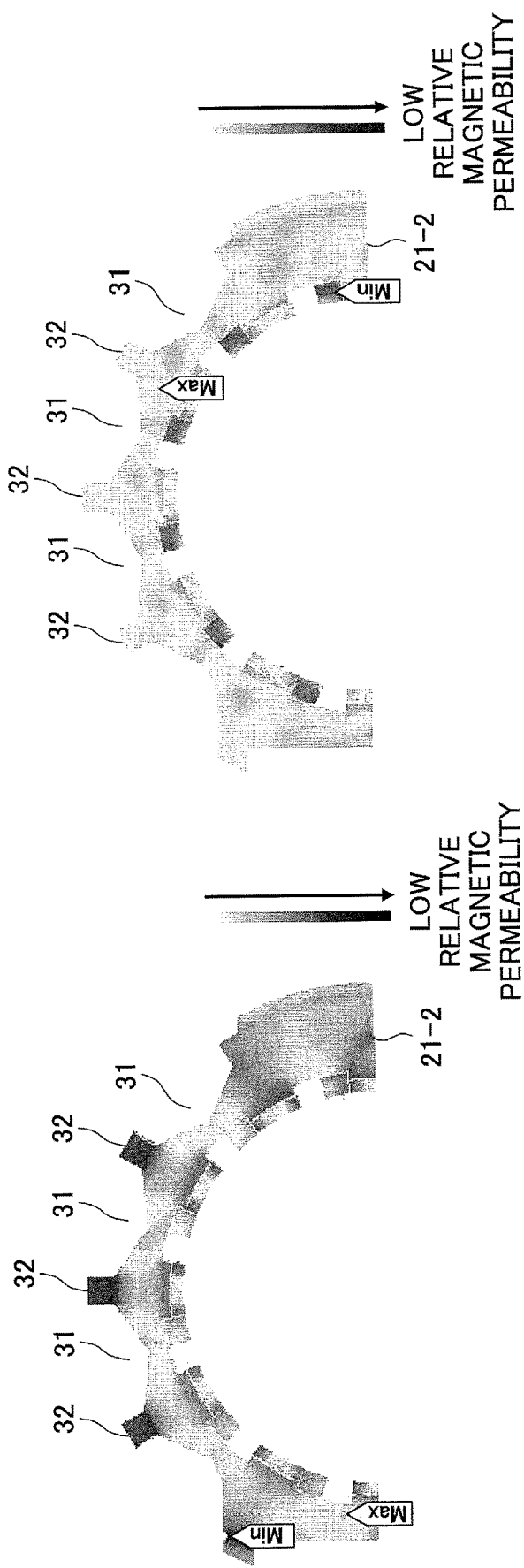

FIGS. 23A and 23B are drawings illustrating a relative magnetic permeability distribution in an inner yoke according to the third embodiment. FIG. 23A shows a relative magnetic permeability distribution of the inner yoke 21-2 at a rotor angle T1, and FIG. 23B shows a relative magnetic permeability distribution of the inner yoke 21-2 at a rotor angle T2.

In the present embodiment, at the rotor angle T1, in the magnetic-path-narrowing portions 32, it can be seen that the relative permeability is reduced due to the magnetic flux concentration, and at the rotor angle T2, the magnetic flux concentration cannot be seen in the inner yoke 21-2 and the reduction of the relative permeability cannot be seen.

In the present embodiment, the salient pole property of the mutual inductance is improved by reduction of the relative permeability due to the magnetic-path-stenosis-portion 32.

In the present embodiment, by making the magnetic path narrow by making the width W2 of the magnetic-path-narrowing portion 32 narrower, that is, by making the cross-sectional area of the magnetic path in the circumferential direction smaller, the magnetic flux is concentrated, the relative permeability is reduced, and the salient pole property is improved.

It should be noted that, the opening portion 31 in the inner yoke 21-2 of A-phase side and the opening portion 31 in the inner yoke 22-2 of B-phase side are formed, but not limited to, in the same shape and at the same position. As long as the changes of the self-inductance and the mutual inductance become closer to a sine wave, the opening portion 31 in the inner yoke 21-2 of A-phase side and the opening portion 31 in the inner yoke 22-2 of B-phase side may not be formed in the same shape or at the same position.

Fourth Embodiment

In the following, a fourth embodiment will be described referring to the accompanied drawings. In the fourth embodiment, a shape of the opening portion formed in the conductor surrounding the coil of each phase is different from the shapes of the opening portion of the third embodiment. In the following description of the fourth embodiment, the difference between the third embodiment and the fourth embodiment will be described, and the same numerical references are given to those having the same functions as the third embodiment, and the detailed description will be omitted.

Figure 24A:
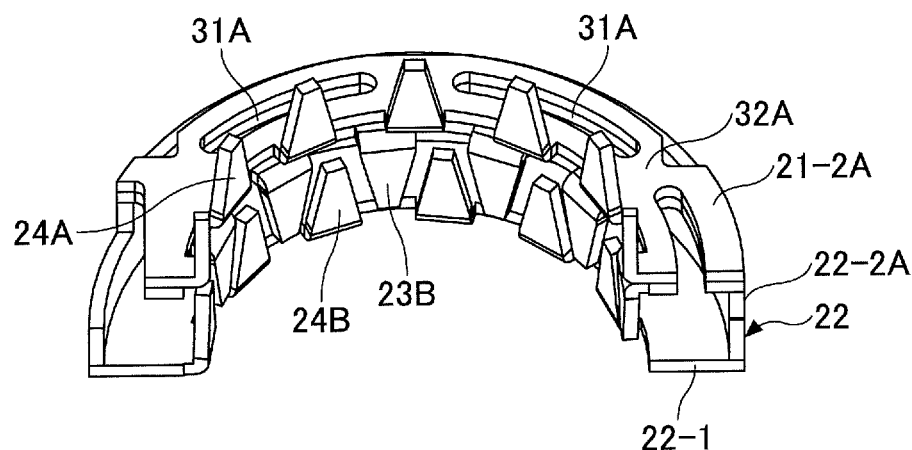
FIGS. 24A and 24B are drawings illustrating a conductor of a stepping motor according to the fourth embodiment.
Figure 24B:
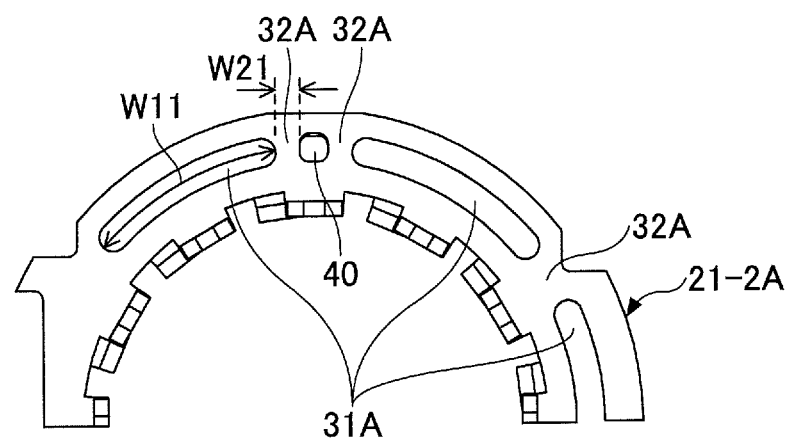

FIGS. 24A and 24B are drawings illustrating a conductor of a stepping motor according to the fourth embodiment. FIG. 24A is a perspective view of the conductor according to the present embodiment, and FIG. 24B is a plan view of an inner yoke 21-2A.

In FIG. 24A, in order to describe the opening portion, the outer yoke 21-1A of the conductor 21 of the A-phase is omitted. Further, FIG. 24B is a plan view of the inner yoke 21-2A of the conductor 21.

In the present embodiment, in a joint surface 26A of the inner yoke 21-2A, magnetic-path-narrowing portions 32A are formed by forming opening portions 31A.

In the present embodiment, in the joint surface 26A of the inner yoke 21-2A, at least two or more opening portions 31A are formed and at least two or more magnetic-path-narrowing portions 32A are formed.

Further, the opening portion 31 is formed in such a way that, when a width of the opening portion 31A of the inner yoke 21-2A in a circumferential direction is denoted as W11 and a width of the magnetic-path-narrowing portions 32A of the inner yoke 21-2A in the circumferential direction is denoted as W21, W11>W21. It should be noted that the width W11 and the width W21 are the widths in the same circumference of the inner yoke 21-2A.

Further, in the present embodiment, it is preferable that any of the widths 21 of the magnetic-path-narrowing portions 32A is equal or less than the width in the circumferential direction of the opening portion 40 for positioning in the inner yoke 21-2A.

For example, in an example of FIGS. 24A and 24B, the opening portions 31A are formed adjacent to each side of the opening portion 40 for positioning, and the magnetic-path-narrowing portions 32A are formed between the opening portion 40 and each of the opening portions 31A.

It is preferable that the width W21 of the magnetic-path-narrowing portions 32A is equal to or less than the width of the opening portion 40 in the circumference direction.

Further, referring to FIGS. 24A and 24B, the inner yoke 21-2A of the conductor 21 has been described. The similar opening portions 31A and the magnetic-path-narrowing portions 32A are formed in the inner yoke 22-2A of the conductor 22. In the present embodiment, it is preferable that, the opening portion 31A and the magnetic-path-narrowing portion 32A in the inner yoke 21-2A of A-phase side and the opening portion 31A and the magnetic-path-narrowing portion 32A in the inner yoke 22-2A of B-phase side are formed, but not limited to, in the same shape and at the same position.

In the present embodiment, by making the shapes of the conductors 21 and 22 as shown in FIGS. 24A and 24B, it is possible to make a change of mutual inductance larger than that of a conventional example.

It should be noted that, in the present embodiment, material of a rotor magnet 20A may be ferrite and material of the conductors 21 and 22 may be SECC steel plate.

Figure 25:
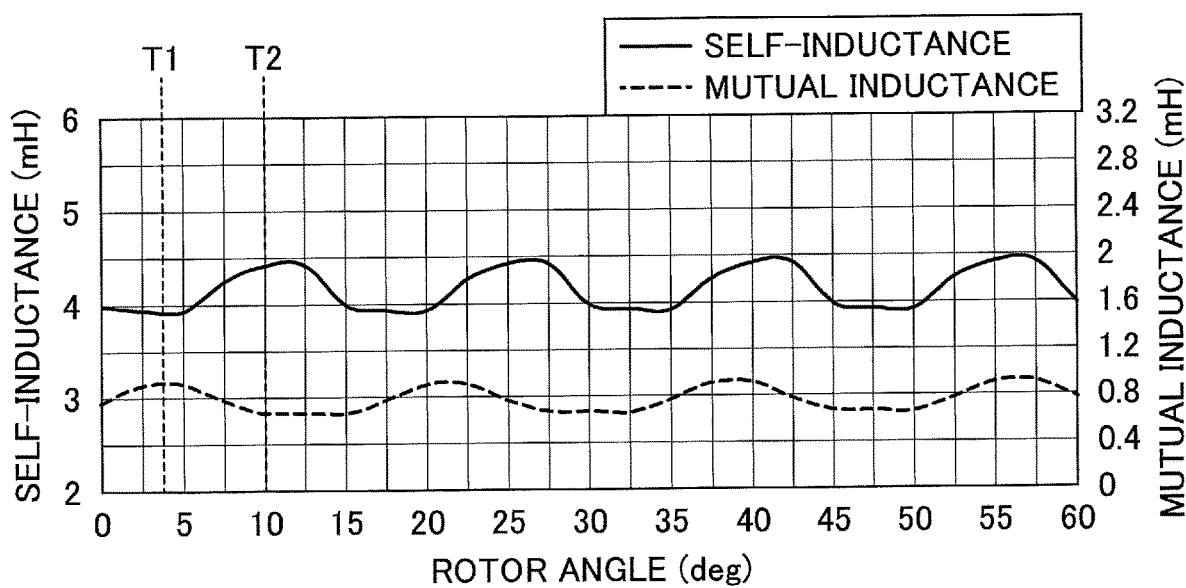
FIG. 25 is a drawing illustrating self-inductance and mutual inductance according to the fourth embodiment.

FIG. 25 is a drawing illustrating self-inductance and mutual inductance according to the fourth embodiment.

According to FIG. 25, it can be seen that the change of the mutual inductance of the motor according to the present embodiment is larger than the change of the self-inductance of a motor of a comparative example (refer to FIG. 21(B)). Therefore, in the motor according to the present embodiment, it is possible to make the salient pole property of the mutual inductance stronger.

Figure 26A:
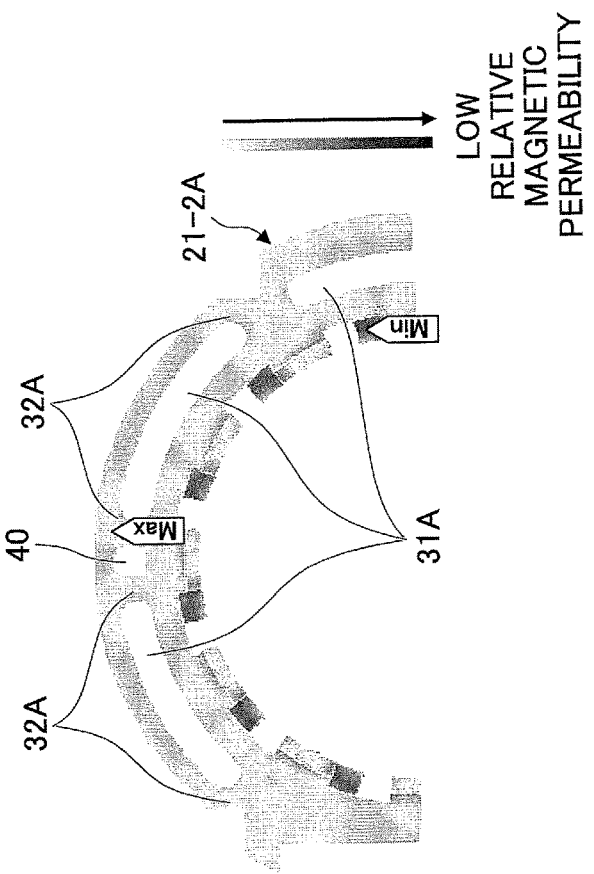
FIGS. 26A and 26B are drawings illustrating a relative magnetic permeability distribution in an inner yoke according to the fourth embodiment.
Figure 26B:
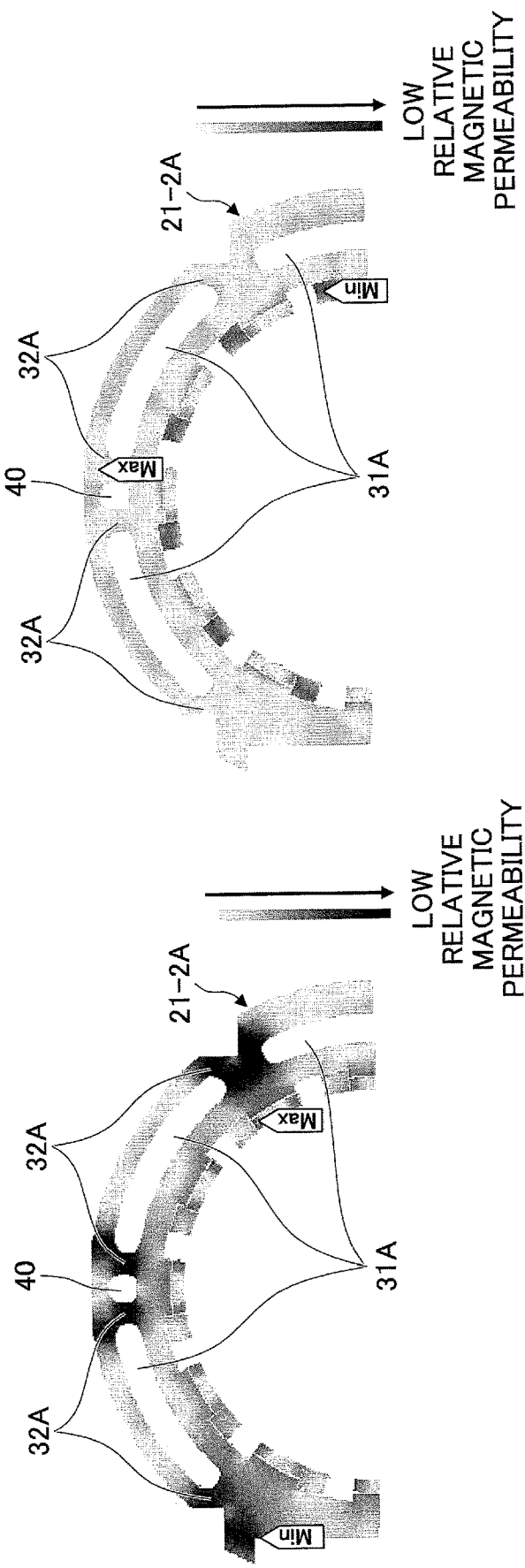

FIGS. 26A and 26B are drawings illustrating a relative magnetic permeability distribution in an inner yoke 21-2A according to the fourth embodiment. FIG. 26A shows a relative magnetic permeability distribution of the inner yoke 21-2A at a rotor angle T1, and FIG. 26B shows a relative magnetic permeability distribution of the inner yoke 21-2A at a rotor angle T2.

In the present embodiment, at the rotor angle T1, in the magnetic-path-narrowing portions 32A, it can be seen that the relative permeability is reduced due to the magnetic flux concentration, and at the rotor angle T2, the magnetic flux concentration cannot be seen in the inner yoke 21-2A and the reduction of the relative permeability cannot be seen.

In the present embodiment, the salient pole property of the mutual inductance is improved by reduction of the relative permeability due to the magnetic-path-narrowing portion 32A. Further, in the present embodiment as in the third embodiment, by making the width W2 of the magnetic-path-narrowing portion 32A narrower, that is, by making the magnetic path narrower, it is possible to make the relative permeability be further reduced, and to improve the salient pole property.

First Modified Example

Figure 27A:
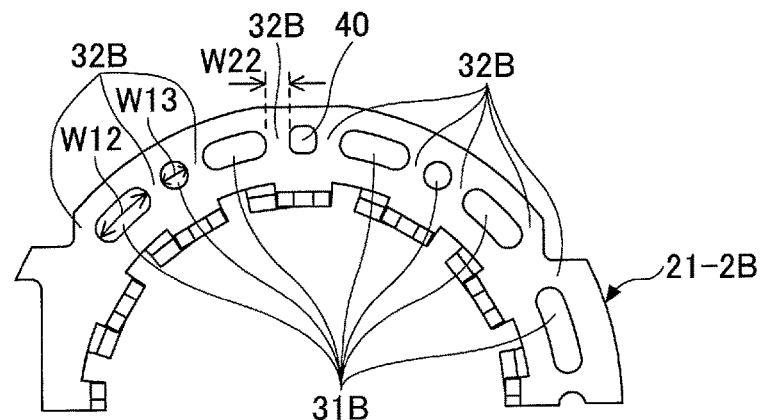
FIGS. 27A and 27B are drawings illustrating the first modified example of the fourth embodiment.
Figure 27B:
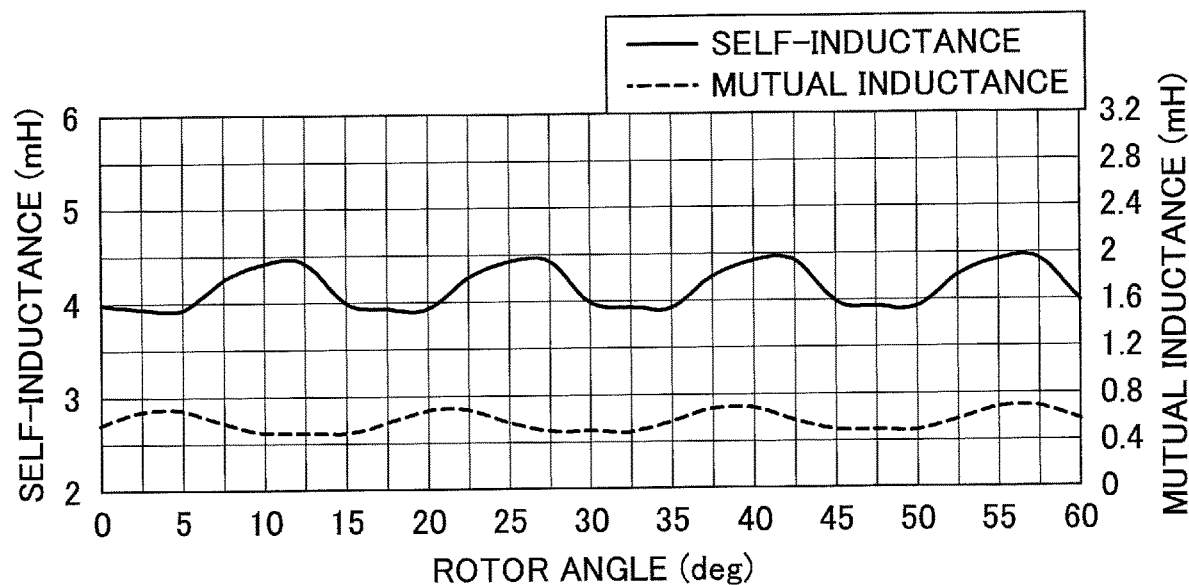

In the following, the first modified example of the fourth embodiment will be described referring to FIGS. 27A and 27B. FIGS. 27A and 27B are drawings illustrating the first modified example of the fourth embodiment. FIG. 27A is a drawing illustrating a plan view of the inner yoke 21-2B of the first modified example, and FIG. 27B is a drawing illustrating a self-inductance and a mutual inductance of the first modified example.

In the first modified example, a number of opening portions 31B more than the number of the opening portions 31A formed in the inner yoke 21-2A in the second embodiment are formed in the inner yoke 21-2B. Further, in the first modified example, the widths of the opening portions 31B formed in the inner yoke 21-2B include different widths.

More specifically, in the first modified example, an opening portion 31B whose width W12 is greater than the width of the opening portion 40 for positioning is formed, and an opening portion 31B whose width W13 is less than the width of the opening portion 40 for positioning is formed.

Further, in the first modified example, the opening portions 31B are formed in such a way that the width W22 of the magnetic-path-stenosis-portion 32B is equal to or less than the width of the opening portion 40 for positioning.

According to the first modified example, it can be seen that, as shown in FIG. 27B, the width of the change of the mutual inductance becomes greater than the width of the change of the mutual inductance of a motor of a comparative example (refer to FIG. 21(B)).

Second Modified Example

Figure 28A:
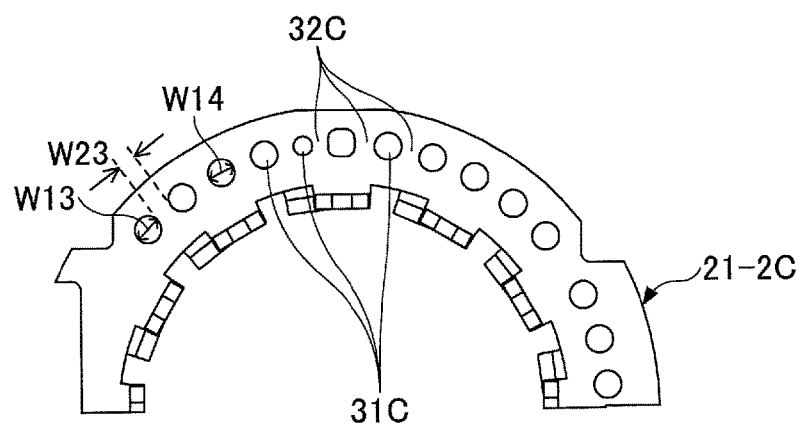
FIGS. 28A and 28B are drawings illustrating the second modified example of the fourth embodiment.
Figure 28B:
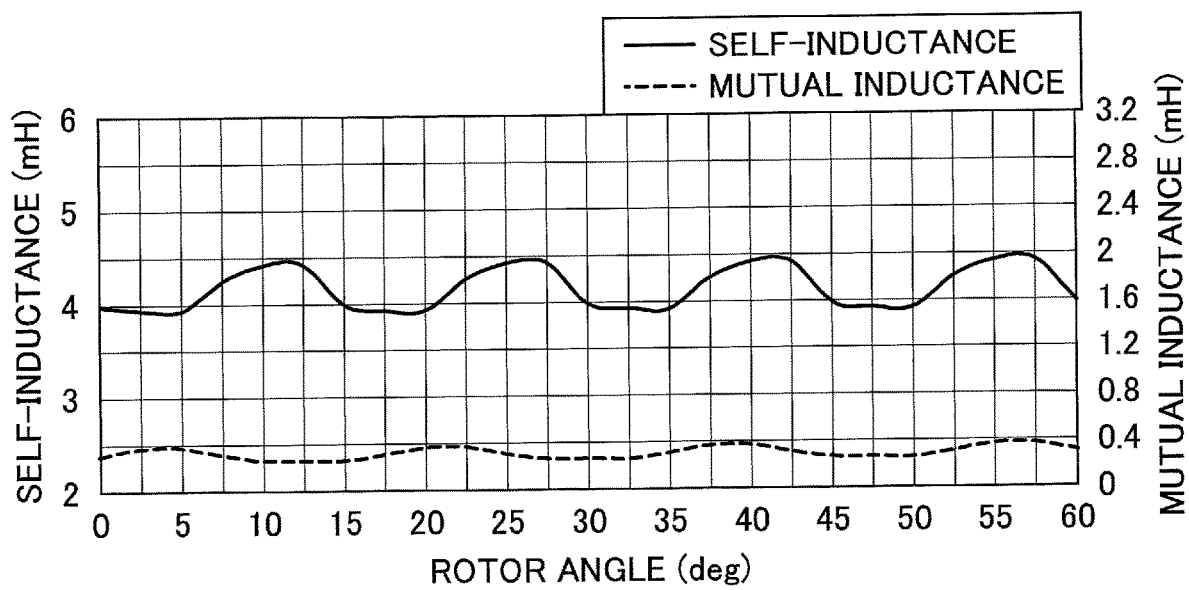

In the following, the second modified example of the fourth embodiment will be described referring to FIGS. 28A and 28B. FIGS. 28A and 28B are drawings illustrating the second modified example of the fourth embodiment. FIG. 28A is a drawing illustrating a plan view of an inner yoke 21-2C of the second modified example, and FIG. 28B is a drawing illustrating self-inductance and mutual inductance of the second modified example.

In the second modified example, a number of opening portions 31C more than the number of the opening portions 31A formed in the inner yoke 21-2A in the second embodiment are formed in the inner yoke 21-2C. Further, in the second modified example, a width W14 of the opening portion 31C formed in the inner yoke 21-2C may be equal to, for example, the width W13 of the opening portion 31B in the first modified example. In other words, in the second modified example, the number of opening portions 31C more than the number of the opening portions 31B formed in the inner yoke 21-2B in the first modified example are formed.

Further, in the second modified example, the opening portions 31C are formed in such a way that a width W23 of the magnetic-path-narrowing portion 32C is equal to or less than the width of the opening portion 40 for positioning.

In the above first and second modified examples, compared to the second embodiment, the number of the magnetic-path-narrowing portions 32B and 32C is increased, and thus, the mechanical strength of the inner yoke 21-2B and 21-2C can be made greater. It should be noted that, in order to reduce the relative magnetic permeability, it is preferable to make the number of the magnetic-path-narrowing portions smaller. Therefore, in the first and second modified examples, the width of the opening portions and the number of the magnetic-path-narrowing portions may be determined based on the mechanical strength and the amplitude of the mutual inductance.

Further, in the first and second modified examples, the rotor magnet 20A may be a magnet of rare earth such as neodymium, and material of the conductors 21 and 22 may be silicon steel sheet or the like. In the first and second modified examples, by using the above materials, an amount of magnetic flux going from the rotor magnet 20A to the conductors 21 and 22 can be increased, and thus, the B-H (magnetic hysteresis) characteristics of the conductors 21 and 22 may be improved. Specifically, it is possible to make the change of the magnetic flux amount with respect to the magnetic field steep.

Therefore, in the first and second modified examples, the magnetic flux can be concentrated in the magnetic-path-narrowing portions and the relative magnetic permeability can be reduced.

In other words, by using the above materials, while securing the mechanical strength, the salient pole property can be improved.

Fifth Embodiment

In the following, a fifth embodiment will be described referring to the accompanied drawings. The fifth embodiment is different from the third embodiment in that the opening portions are formed in the inner edge portion of the inner yoke. In the following description of the fifth embodiment, the difference between the third embodiment and the fifth embodiment will be described, and the same numerical references are given to those having the same functions as the third embodiment, and the detailed description will be omitted.

Figure 29A:
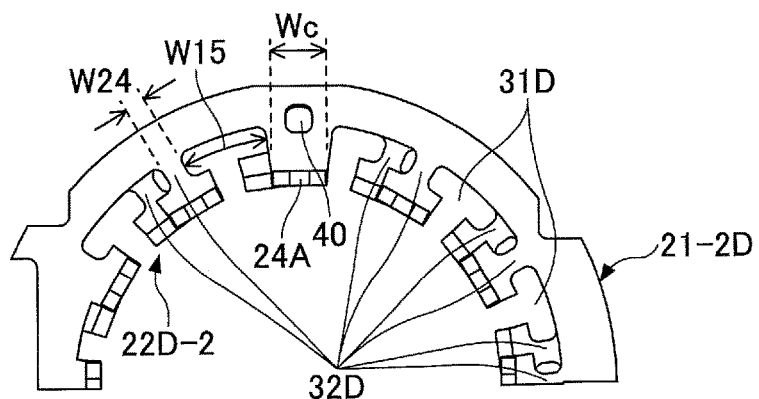
FIGS. 29A and 29B are drawings illustrating an inner yoke of a stepping motor, self-inductance and mutual inductance according to the fifth embodiment.
Figure 29B:
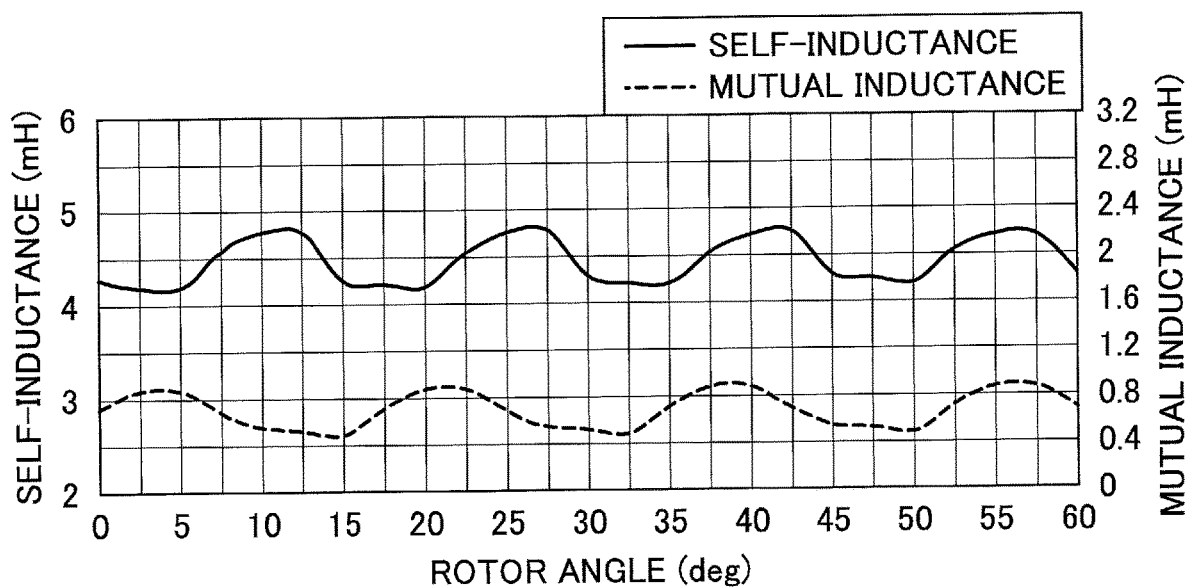

FIGS. 29A and 29B are drawings illustrating an inner yoke of a stepping motor, self-inductance and mutual inductance according to the fifth embodiment. FIG. 29A is a drawing illustrating a plan view of an inner yoke 21-2D of the fifth embodiment, and FIG. 29B is a drawing illustrating the self-inductance and the mutual inductance according to the fifth embodiment.

In the present embodiment, a plurality of opening portions 31D are formed in the inner edge portion of the inner yoke 21-2D, and magnetic-path-narrowing portions 32D are formed between the opening portions 31D.

The opening portions 31D of the present embodiment are formed in the inner edge portion between the claw-poles 24A. By forming the opening portions 31D as described above, the magnetic-path-narrowing portions 32D are formed at positions corresponding to the claw-poles 24A.

Further, a width W15 of the opening portions 31D according to the present embodiment is formed in such a way that a width W24 of the magnetic-path-narrowing portions 32D is equal to or less than the greatest width Wc of the claw-poles 24A. In other words, the opening portions 31D according to the present embodiment are formed in such a way that the width W15 of the opening portions 31D is longer than the greatest width Wc of the claw-poles 24A.

More specifically, the width W15 of the opening portions 31D is formed in such a way that the width W24 of the magnetic-path-narrowing portions 32D is one third of the greatest width Wc of the claw-poles 24A. It should be noted that at least two of the magnetic-path-narrowing portions 32D may be formed in such a way that the width W24 is one third of the width Wc.

Further, in the present embodiment, it is preferable that corresponding magnetic-path-narrowing portions 32D are formed for all of the claw-poles 24A included in the inner yoke 21-2D.

According to the present embodiment, as shown in FIG. 29B, it can be seen that the change width of the mutual inductance is larger even compared with the fourth embodiment (refer to FIG. 25). Further, in the present embodiment, it can be seen that, compared to the fourth embodiment, the mutual inductance average value is lower, and thus, cogging torque can be reduced. It should be noted that the cogging torque is a plus torque or a minus torque which is generated along with the rotor rotation even in the non-energized state.

FIGS. 30A and 30B are drawings illustrating an inner yoke of a stepping motor according to the fifth embodiment. FIG. 30A is a drawing illustrating a plan view of the inner yoke 21-2D of A-phase side, and FIG. 30B is a drawing illustrating a plan view of the inner yoke 22-2D of B-phase side.

In the present embodiment, as shown in FIG. 30A and FIG. 30B, the positions of the claw-poles 23B formed in the inner yoke 22-2D of the B-phase side is shifted from the positions of the claw-poles 24A formed in the inner yoke 21-2D of the A-phase side (refer to FIG. 19).

In the inner yoke 22-2D, the opening portions 31D are formed in the inner edge portion between the claw-poles 23B, while the magnetic-path-narrowing portions 32D are formed at positions corresponding to the claw-poles 23B included in the inner yoke 22-2D.

Sixth Embodiment

In the following, a sixth embodiment will be described referring to the accompanied drawings. The sixth embodiment is different from the fourth embodiment in that, in the conductor surrounding the coil of each phase, a groove is formed in addition to the opening portions. In the following description of the sixth embodiment, the difference between the fourth embodiment and the sixth embodiment will be described, the same numerical references are given to those having the same functions as the fourth embodiment, and the detailed description will be omitted.

Figure 31A:
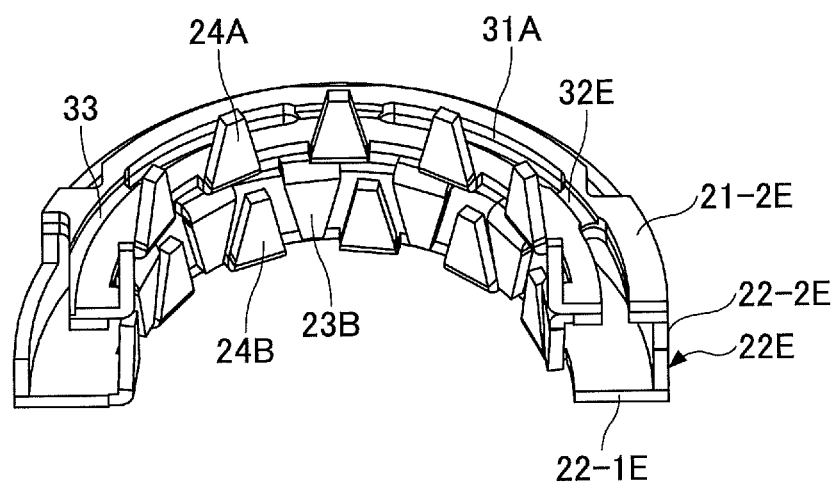
FIGS. 31A and 31B are drawings illustrating a conductor of a stepping motor according to the sixth embodiment.
Figure 31B:
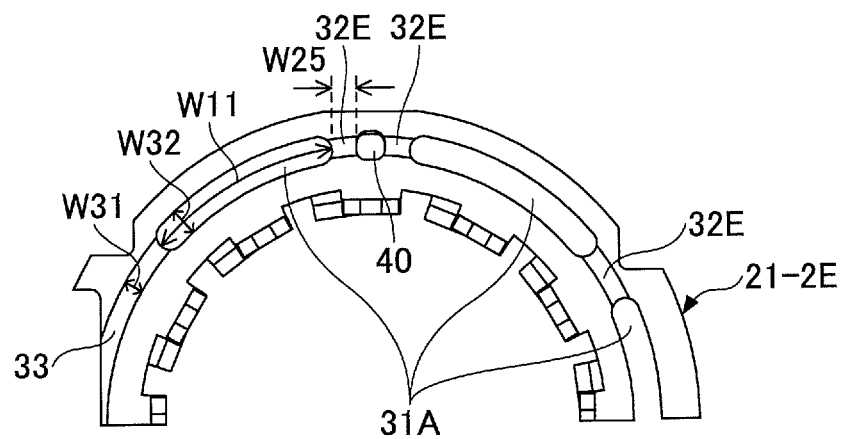

FIGS. 31A and 31B are drawings illustrating a conductor of a stepping motor according to the sixth embodiment. FIG. 31A is a perspective view of the conductor according to the present embodiment, and FIG. 31B is a plan view of the inner yoke 21-2E of the conductor 21.

In the present embodiment, in the inner yoke 21-2E, a circular groove 33 is formed along the outer circumference circle in which the opening portions 31A are formed. A width W31 of the groove 33 is less than the width W32 of the opening portion 31A in a direction orthogonal to the width W11 (radial direction): the width W32>the width W31. It should be noted that the width W31 of the groove 33 is a width in a direction orthogonal to the circumferential direction (radial direction).

In the present embodiment, for example, the width W31 may be 1 mm and the width W32 may be 1.5 mm.

In the present embodiment, by forming the groove 33 as described above, the magnetic-path-narrowing portions 32E formed by the opening portion 31A and the groove 33 become thinner by the depth of the groove 33. In other words, the magnetic-path-narrowing portion 32E becomes narrower than the magnetic-path-narrowing portion 32A of the fourth embodiment.

Figure 32:
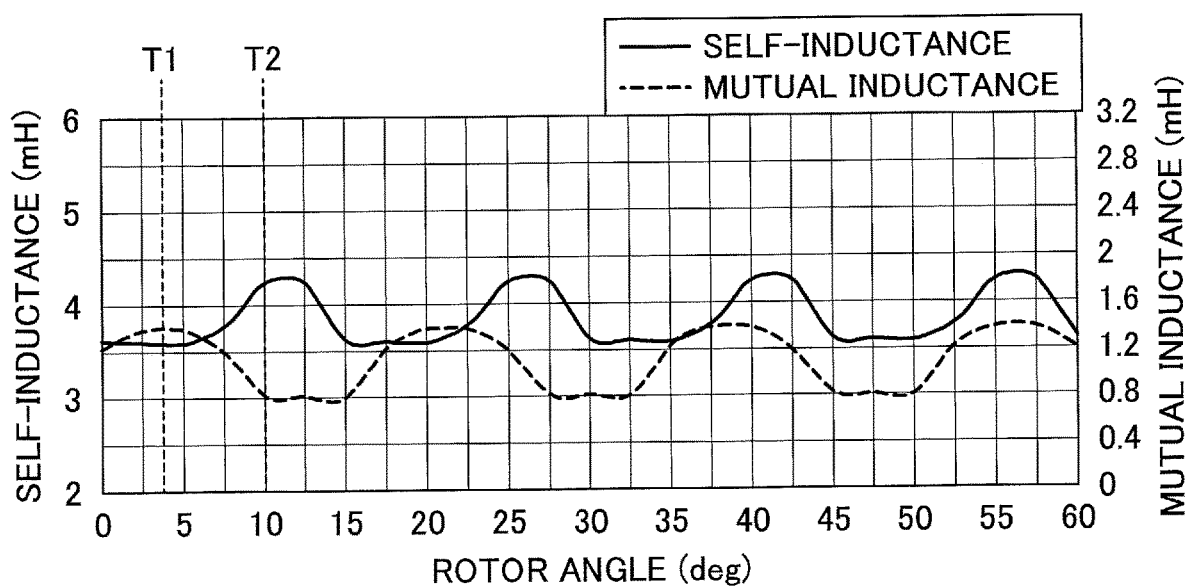
FIG. 32 is a drawing illustrating self-inductance and mutual inductance according to the sixth embodiment.

FIG. 32 is a drawing illustrating self-inductance and mutual inductance according to the sixth embodiment.

In FIG. 32, it can be seen that, compared with the mutual inductance of the motor of the comparative example (refer to FIG. 21(B)), the change of the mutual inductance is much larger. Therefore, in the motor according to the present embodiment, it is possible to make the salient pole property of the mutual inductance stronger.

Figure 33A:
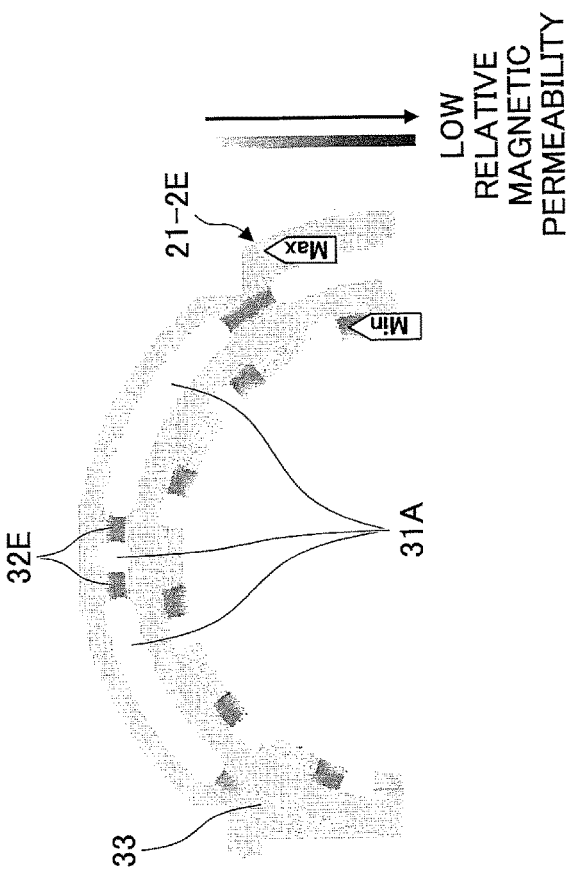
FIGS. 33A and 33B are drawings illustrating a relative magnetic permeability distribution in an inner yoke according to the sixth embodiment.
Figure 33B:
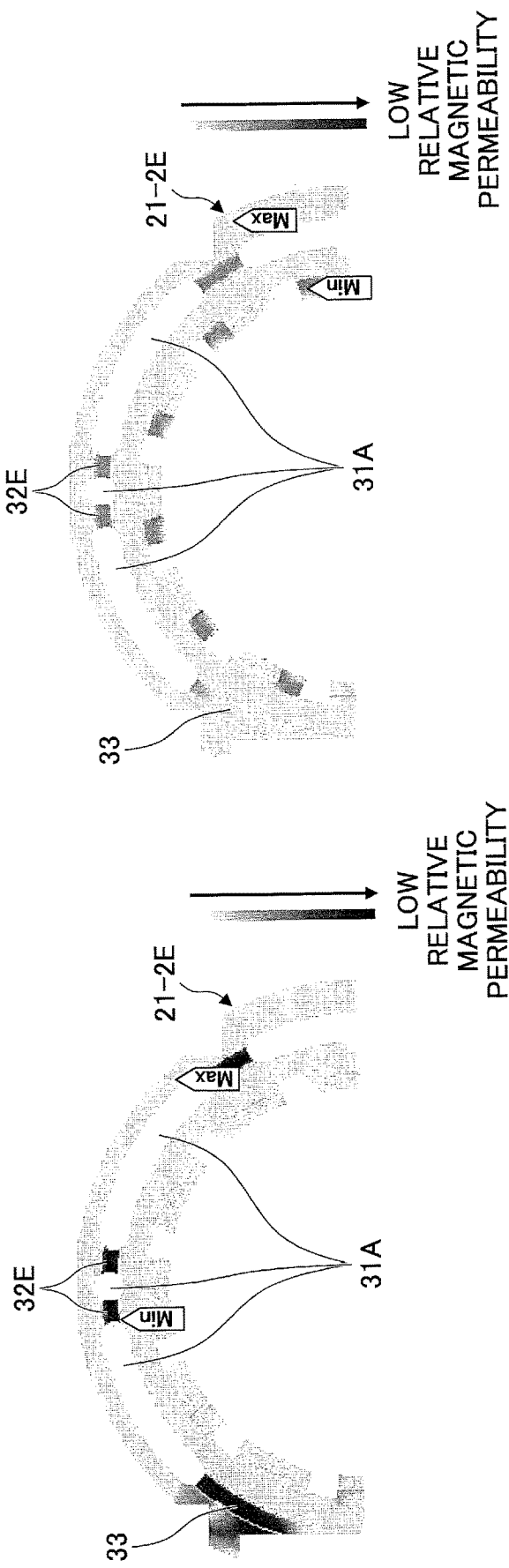

FIGS. 33A and 33B are drawings illustrating a relative magnetic permeability distribution in an inner yoke according to the sixth embodiment. FIG. 33A shows a relative magnetic permeability distribution of the inner yoke 21-2E at a rotor angle T1, and FIG. 33B shows a relative magnetic permeability distribution of the inner yoke 21-2E at a rotor angle T2.

In the present embodiment, at the rotor angle T1, in the magnetic-path-narrowing portions 32E, it can be seen that the relative permeability is reduced due to the magnetic flux concentration, and at the rotor angle T2, the magnetic flux concentration cannot be seen in the inner yoke 21-2E and the reduction of the relative permeability cannot be seen.

In the present embodiment, the salient pole property of the mutual inductance is improved by reduction of the relative permeability due to the magnetic-path-narrowing portion 32E.

Seventh Embodiment

In the following, a seventh embodiment will be described referring to the accompanied drawings. The seventh embodiment is different from the sixth embodiment in that the width of the groove formed in addition to the opening portion is made greater than the width of the opening portion in the radial direction. In the following description of the seventh embodiment, the difference between the sixth embodiment and the seventh embodiment will be described, the same numerical references are given to those having the same functions as the sixth embodiment, and the detailed description will be omitted.

Figure 34:
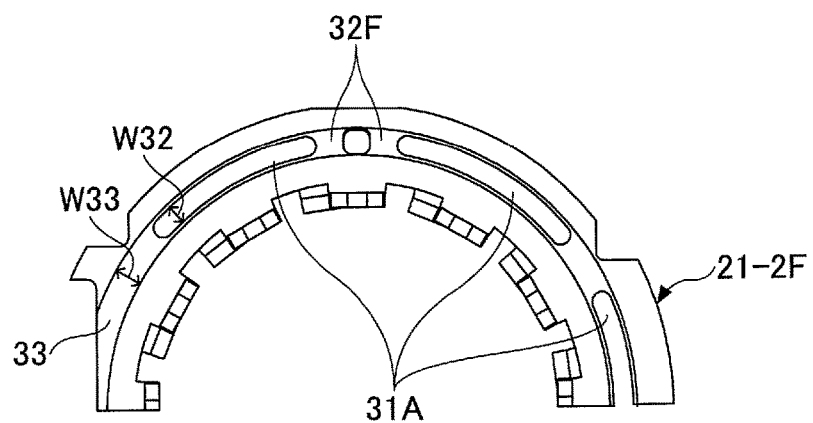
FIG. 34 is a drawing illustrating a conductor of a stepping motor according to the seventh embodiment.

FIG. 34 is a drawing illustrating a conductor of a stepping motor according to the seventh embodiment. FIG. 34 is a plan view of the inner yoke 21-2F of the A-phase side.

In the present embodiment, a width W33 of a groove 33 in the radial direction is formed in such a way that the width W33 of the groove 33 in the radial direction is equal to or greater than a width W32 of the opening portion 31A in the radial direction (the width W32≤the width W33).

Therefore, the magnetic-path-narrowing portion 32F formed by the opening portion 31A and the groove 33 becomes thinner by the depth of the groove 33 in more area in the radial direction compared to the magnetic-path-narrowing portion 32E according to the sixth embodiment.

Figure 35:
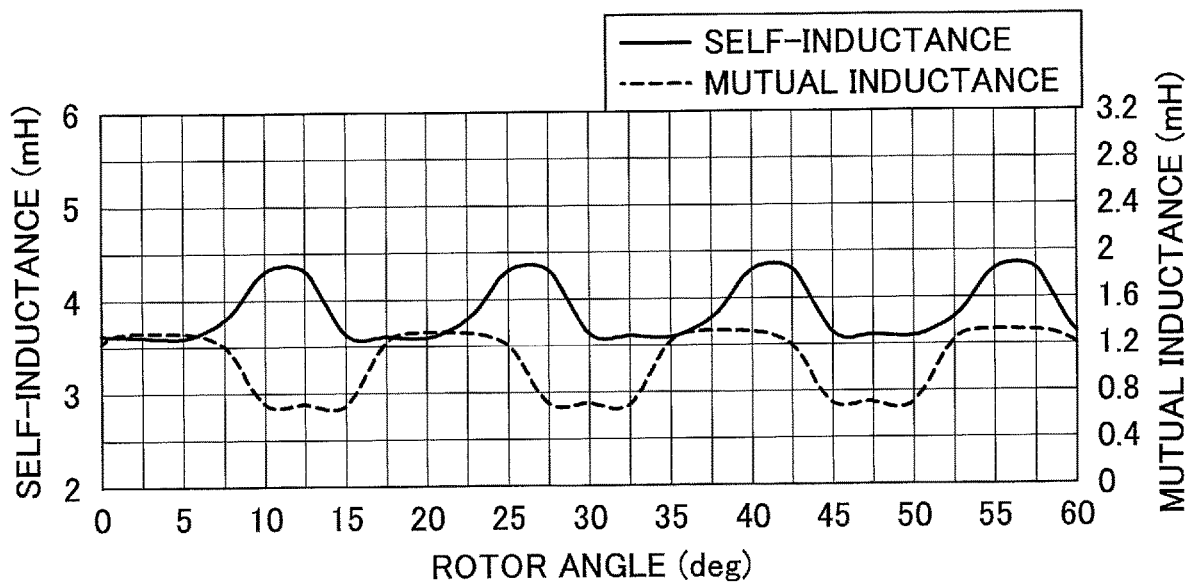
FIG. 35 is a drawing illustrating self-inductance and mutual inductance according to the seventh embodiment.

FIG. 35 is a drawing illustrating self-inductance and mutual inductance according to the seventh embodiment.

The change width of the mutual inductance according to the present embodiment is almost the same as the sixth embodiment, but the mutual inductance average value is lowered. Therefore, it can be seen that, in the present embodiment, the same level of salient pole property as the sixth embodiment is maintained while the cogging torque can be reduced.

Figure 36:
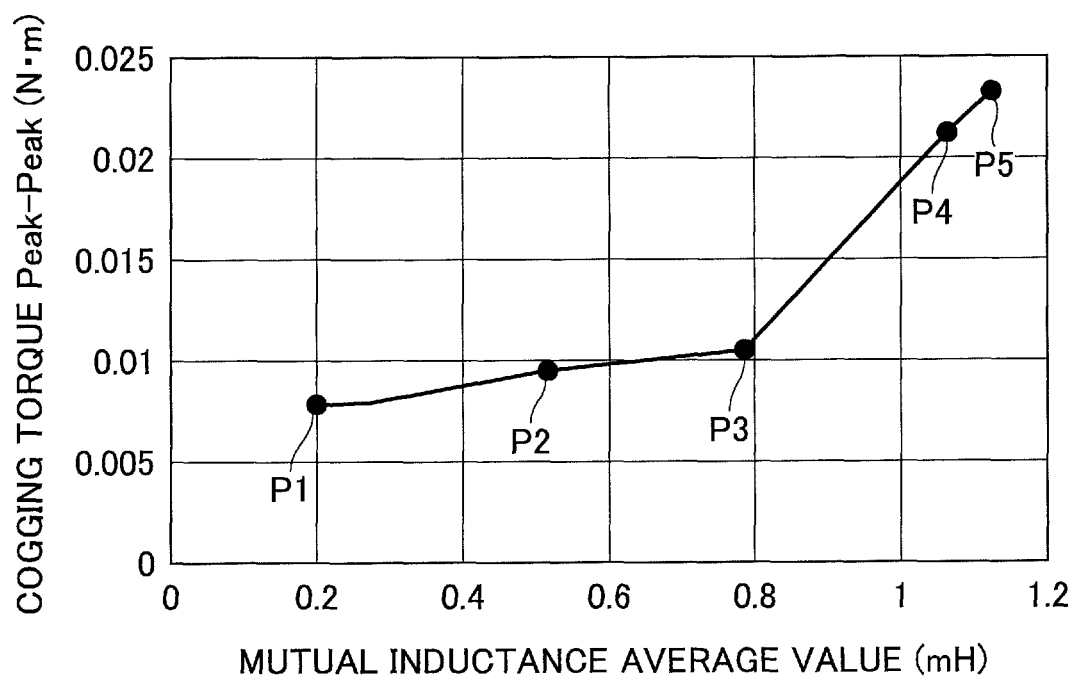
FIG. 36 is a drawing illustrating mutual inductances and cogging torques of the embodiments.

In the following, referring to FIG. 36, relationships between the cogging torque and the mutual inductance average value will be described for a stepping motor of a comparative example and for stepping motors of the third, fourth, sixth, and seventh embodiments. FIG. 36 is a graph illustrating mutual inductances and cogging torques according to the embodiments.

FIG. 36 shows a relationship between a mutual inductance average value and a cogging torque value from a plus peak to a minus peak.

As can be seen from FIG. 36, in the seventh embodiment, almost the same level of salient pole property as the sixth embodiment is maintained while the cogging torque can be reduced.

It should be noted that the size of the stepping motors used for simulation for measuring the self-inductance and the mutual inductance in the first and second embodiments is different from the size of the stepping motors used for simulation for measuring the self-inductance and the mutual inductance in the third through seventh embodiments.

Specifically, the outer diameter of the stepping motor of the third through seventh embodiments is smaller than the outer diameter of the stepping motor of the first and second embodiments, the magnetic force of the stepping motor of the third through seventh embodiments is weaker than the magnetic force of the stepping motor of the first and second embodiments, and the number of turns of the coil of the third through seventh embodiments is smaller than the number of turns of the coil of the first and second embodiments.

Further, in the third through seventh embodiments, the conductors 21 and 22 are formed by, but not limited to, an inner yoke and an outer yoke. The conductors 21 and 22 may be integrally formed.

As described above, the present invention has been described according to the embodiments, but the present invention is not limited to the above embodiments. Modifications to the above embodiments may be possible without departing from the spirit of the present invention and may be defined accordingly depending on applications.

The present application is based on and claims the benefit of priority of Japanese Priority Application No. 2014-238934 filed on Nov. 26, 2014 and Japanese Priority Application No. 2015-227018 filed on Nov. 19, 2015, the entire contents of which are hereby incorporated herein by reference.

What is claimed is:

1. A permanent magnet motor, comprising:
   a rotor, including a rotation axle and a plurality of magnetized rotor magnets on a periphery of the rotor, the plurality of magnetized rotor magnets being magnetized to alternately form N-poles and S-poles;
   a first ring-shaped claw-pole unit, an inner circumference of the first ring-shaped claw-pole unit facing the plurality of magnetized rotor magnets, the first ring-shaped claw-pole unit including a plurality of first claw-poles along the inner circumference of the first ring-shaped claw-pole unit, each of the plurality of first claw-poles being closely adjacent to other of the plurality of first claw-poles and extending alternately in an upward axis direction of the rotation axle and in a downward axis direction of the rotation axle, wherein a bottom side of the plurality of first claw-poles form a ring shape; and
   a second ring-shaped claw-pole unit, an inner circumference of the second ring-shaped claw-pole unit facing the plurality of magnetized rotor magnets, the second ring-shaped claw-pole unit including a plurality of second claw-poles along the inner circumference of the second ring-shaped claw-pole unit, each of the plurality of second claw-poles being closely adjacent to other of the plurality of second claw-poles and extending alternately in an upward axis direction of the rotation axle and in a downward axis direction of the rotation axle, wherein a bottom side of the plurality of second claw-poles form a ring shape;
   a first joint surface of the first ring-shaped claw-pole unit including a plurality of first opening portions, and
   a second joint surface of the second ring-shaped claw-pole unit including a plurality of second opening portions, the second joint surface of the second ring-shaped claw-pole unit to be joined to the first joint surface of the first ring-shaped claw-pole unit,
   a plurality of magnetic-path-narrowing portions being formed between the plurality of first opening portions and the plurality of second opening portions, and
   the plurality of first opening portions, the plurality of second opening portions, and a width of at least one of the plurality of magnetic-path-narrowing portions, in a circumferential direction, being equal to or less than a width of at least one of the plurality of first opening portions and the plurality of second opening portions.

2. The permanent magnet motor of claim 1,
   wherein a center of the first opening portion and a center of the second opening portion are on a same straight line as a center of the first ring-shaped claw-pole unit extending downward to the first joint surface.

3. The permanent magnet motor of claim 1, wherein the plurality of first opening portions and the plurality of second opening portions are formed in an inner edge portion of the first ring-shaped claw-pole unit and in an inner edge portion of the second ring-shaped claw-pole unit, respectively.

4. The permanent magnet motor of claim 1, wherein the plurality of first opening portions and the plurality of second opening portions are formed in an outer edge portion of the first ring-shaped claw-pole unit and in an outer edge portion of the second ring-shaped claw-pole unit, respectively.

5. The permanent magnet motor of claim 1, wherein the first joint surface of the first ring-shaped claw-pole unit includes a plurality of first opening portions and the second joint surface of the second ring-shaped claw-pole unit includes a plurality of second opening portions,
wherein at least two of the plurality of the first opening portions and at least two of the plurality of the second opening portions are formed in the first ring-shaped claw-pole unit and the second ring-shaped claw-pole unit, respectively, along a circumferential direction, and wherein
in the first ring-shaped claw-pole unit and the second ring-shaped claw-pole unit, along the circumferential direction in which the at least two of the plurality of first opening portions and the at least two of the plurality of second opening portions are respectively formed, arc-shaped grooves are respectively formed between the at least two of the plurality of first opening portions and the at least two of the plurality of second opening portions.

6. The permanent magnet motor of claim 5, wherein a width of the arc-shaped grooves of the first ring-shaped claw-pole unit and the second ring-shaped claw-pole units in a radial direction, is equal to or relatively less than a width of the at least two of the plurality of first opening portions and the at least two of the plurality of the second opening portions in the radial direction.

7. The permanent magnet motor of claim 5, wherein a width of the arc-shaped grooves of the first ring-shaped claw-pole unit and the second ring-shaped claw-pole units in a radial direction, is relatively greater than a width of the at least two of the plurality of first opening portions and the at least two of the plurality of second opening portions in the radial direction.

8. A position estimation apparatus, comprising:
the permanent magnet motor of claim 1;
a high-frequency generator configured to generate a high-frequency signal supplied to an armature coil of the permanent magnet motor;
a current detector configured to detect a high-frequency current component as a response to the high-frequency signal generated; and
a position estimator configured to, based on the high-frequency signal generated and the high-frequency current component detected, estimate a position of the rotor of the permanent magnet motor.

9. A motor drive control apparatus, comprising the position estimation apparatus of claim 8.

10. The permanent magnet motor of claim 1, wherein at least two of the plurality of the first opening portions and at least two of the plurality of the second opening portions are formed in the first ring-shaped claw-pole unit and the second ring-shaped claw-pole unit, respectively, along a circumferential direction, and wherein
in the first ring-shaped claw-pole unit and the second ring-shaped claw-pole unit, along the circumferential direction in which the at least two of the plurality of first opening portions and the at least two of the plurality of second opening portions are respectively formed, arc-shaped grooves are respectively formed between the at least two of the plurality of first opening portions and the at least two of the plurality of second opening portions.

11. The permanent magnet motor of claim 10, wherein a width of the arc-shaped grooves of the first ring-shaped claw-pole unit and the second ring-shaped claw-pole unit in a radial direction, is equal to or relatively less than a width of the at least two of the plurality of first opening portions and the at least two of the plurality of the second opening portions in the radial direction.

12. The permanent magnet motor of claim 10, wherein a width of the arc-shaped grooves of the first ring-shaped claw-pole unit and the second ring-shaped claw-pole unit in a radial direction, is relatively greater than a width of the at least two of the plurality of first opening portions and the at least two of the plurality of second opening portions in the radial direction.

13. A position estimation apparatus, comprising:
the permanent magnet motor of claim 2;
a high-frequency generator configured to generate a high-frequency signal supplied to an armature coil of the permanent magnet motor;
a current detector configured to detect a high-frequency current component as a response to the high-frequency signal generated; and
a position estimator configured to, based on the high-frequency signal generated and the high-frequency current component detected, estimate a position of the rotor of the permanent magnet motor.

14. A motor drive control apparatus, comprising the position estimation apparatus of claim 13.

* * * * *